(12) United States Patent
Bhutani et al.

(10) Patent No.: US 9,845,805 B2
(45) Date of Patent: Dec. 19, 2017

(54) DUAL OPERATION CENTRIFUGAL FAN APPARATUS AND METHODS OF USING SAME

(75) Inventors: Gurmeet Bhutani, Punjab (IN);
Cheng-Kuo Wang, HsinChu (TW);
Hung-Pin Chien, Taipei (TW);
Li-Chung Liu, Zhongli (TW); Tien Hsiang Wu, Taipei (TW)

(73) Assignee: Dell Products, L.P., Round Rock, TX (US)

( * ) Notice: Subject to any disclaimer, the term of this patent is extended or adjusted under 35 U.S.C. 154(b) by 1124 days.

(21) Appl. No.: 12/804,826

(22) Filed: Jul. 29, 2010

(65) Prior Publication Data

US 2012/0026677 A1    Feb. 2, 2012

(51) Int. Cl.
| | |
|---|---|
| F01D 1/02 | (2006.01) |
| G06F 1/20 | (2006.01) |
| F04D 25/06 | (2006.01) |
| F04D 27/00 | (2006.01) |
| F04D 29/70 | (2006.01) |

(52) U.S. Cl.
CPC ....... F04D 25/0613 (2013.01); F04D 27/004 (2013.01); F04D 29/703 (2013.01); G06F 1/20 (2013.01)

(58) Field of Classification Search
CPC . G06F 1/20; G06F 1/203; F04D 17/04; F04D 29/703; F04D 25/0613; F04D 27/004
USPC .............. 454/184; 415/203, 220; 361/679.48
See application file for complete search history.

(56) References Cited

U.S. PATENT DOCUMENTS

| | | | | |
|---|---|---|---|---|
| 3,614,275 A | * | 10/1971 | Eibsen | ............. F01C 21/18 417/315 |
| 4,252,181 A | * | 2/1981 | Kirchmeier | ....................... 165/7 |
| 5,772,500 A | * | 6/1998 | Harvey et al. | ................ 454/184 |
| 6,042,474 A | * | 3/2000 | Harvey et al. | ................ 454/184 |
| 6,111,748 A | * | 8/2000 | Bhatia | ............. F04D 17/04 165/122 |
| 6,116,856 A | * | 9/2000 | Karadgy et al. | ............. 416/203 |
| 6,217,281 B1 | * | 4/2001 | Jeng et al. | ..................... 415/119 |
| 6,227,961 B1 | * | 5/2001 | Moore et al. | ................ 454/229 |
| 6,628,519 B2 | * | 9/2003 | Umetsu | .................... 361/679.51 |
| 6,652,223 B1 | * | 11/2003 | Horng | ............. F04D 25/0613 361/679.48 |

(Continued)

OTHER PUBLICATIONS

Wikipedia, "Centrifugal Fan", Printed From Internet May 10, 2010, 6 pgs.

(Continued)

*Primary Examiner* — Alissa Tompkins
*Assistant Examiner* — Phillip E Decker
(74) *Attorney, Agent, or Firm* — Egan Peterman Enders Huston

(57) ABSTRACT

Dual operation centrifugal fan apparatus and methods of operating same that may be used, for example, to cool the internal heat-generating components of an information handling system or other device. The dual operation centrifugal fan apparatus may be implemented in one embodiment as a self-cleaning blower apparatus that is operated in a first normal cooling direction to dissipate heat from internal components of an information handling system, and operated in second cleaning direction to reverse airflow and expel accumulated dust from the interior of the information handling system.

28 Claims, 14 Drawing Sheets

(56) References Cited

U.S. PATENT DOCUMENTS

| | | | |
|---|---|---|---|
| 6,744,631 B1* | 6/2004 | Chuang | G06F 1/203 454/184 |
| 6,778,390 B2* | 8/2004 | Michael | H01L 23/467 361/679.48 |
| 7,255,532 B2* | 8/2007 | Zheng | F04D 29/444 415/183 |
| 7,262,704 B2 | 8/2007 | Shetty et al. | |
| 7,317,614 B2* | 1/2008 | Ruch | G06F 1/203 165/185 |
| 7,325,590 B2* | 2/2008 | Kim | G06F 1/203 165/104.21 |
| 7,336,489 B1* | 2/2008 | Chen | G06F 1/203 165/104.33 |
| 7,443,670 B2* | 10/2008 | Nishi et al. | 361/695 |
| 7,450,380 B2* | 11/2008 | Curtis | G06F 1/20 361/694 |
| 7,455,706 B2* | 11/2008 | Latham et al. | 55/385.1 |
| 7,542,272 B2* | 6/2009 | Pike et al. | 361/679.48 |
| 7,630,201 B2* | 12/2009 | Asahi | 361/695 |
| 7,633,751 B2* | 12/2009 | Shinotou et al. | 361/679.5 |
| 7,688,579 B2* | 3/2010 | Hwang et al. | 361/679.52 |
| 7,714,731 B2* | 5/2010 | Palaszewski | 340/584 |
| 7,806,344 B2* | 10/2010 | Chang | 236/49.3 |
| 7,872,864 B2* | 1/2011 | Mongia et al. | 361/695 |
| 7,969,738 B2* | 6/2011 | Koo | 361/701 |
| 8,068,339 B2* | 11/2011 | Kayama et al. | 361/695 |
| 8,083,477 B2* | 12/2011 | Hwang et al. | 415/206 |
| 8,251,642 B2* | 8/2012 | Hwang et al. | 415/102 |
| 2005/0274497 A1* | 12/2005 | Huang et al. | 165/121 |
| 2006/0056966 A1* | 3/2006 | Liu | 415/220 |
| 2006/0213643 A1* | 9/2006 | Hashimoto et al. | 165/80.3 |
| 2007/0097643 A1* | 5/2007 | Cheng | H01L 23/427 361/700 |
| 2007/0140842 A1* | 6/2007 | Hill | F04D 29/703 415/206 |
| 2008/0019827 A1* | 1/2008 | Hirata | 415/206 |
| 2008/0056900 A1* | 3/2008 | Seidler | F04D 25/0613 416/193 R |
| 2008/0107523 A1* | 5/2008 | Chen et al. | 415/206 |
| 2008/0286130 A1* | 11/2008 | Purvines | 417/410.1 |
| 2009/0009960 A1* | 1/2009 | Melanson et al. | 361/687 |
| 2009/0097202 A1* | 4/2009 | Gipson | 361/695 |
| 2009/0185349 A1* | 7/2009 | Hata | G06F 1/203 361/697 |
| 2009/0215380 A1* | 8/2009 | Lin | 454/184 |
| 2009/0219673 A1* | 9/2009 | Tamura | G06F 1/203 361/676 |
| 2009/0324403 A1* | 12/2009 | Zheng | 415/203 |
| 2010/0074746 A1* | 3/2010 | Huang | 415/220 |
| 2010/0080719 A1* | 4/2010 | Boggess et al. | 417/423.14 |
| 2010/0084123 A1* | 4/2010 | Shishido | G06F 1/203 165/200 |
| 2010/0089090 A1* | 4/2010 | Kim | F24F 1/0007 62/426 |
| 2010/0175554 A1* | 7/2010 | Huddleston et al. | 95/273 |
| 2012/0115408 A1* | 5/2012 | Hagensen | 454/251 |
| 2013/0081779 A1* | 4/2013 | Liao | G06F 1/203 165/11.1 |
| 2014/0118939 A1* | 5/2014 | Lin | F04D 25/0613 361/695 |

OTHER PUBLICATIONS

Keith Huddleston, "Cooling System With Debris Filtering", DC-16171, U.S. Appl. No. 12/354,041, filed Jan. 15, 2009, 31 pgs.

* cited by examiner

DUAL OPERATION CENTRIFUGAL FAN APPARATUS AND METHODS OF USING SAME

FIELD OF THE INVENTION

This invention relates generally to centrifugal fan apparatus, and more particularly to dual operation centrifugal fan apparatus for information handling systems and other devices.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems and other devices often utilize blower apparatus or cooling fans to regulate temperature generated within a chassis of the device. For example, notebook computers and similar devices often employ a blower to cool the system chipset together with other heat sources that may be present within the chassis. Due to notebook computer architecture and component placement, the blower inlet is typically defined in the bottom of the system where there is a greater probability that the blower fan will ingest dirt, lint and other impurities that over time tend to clog the thermal heat sink and/or other system components, leading to reduced thermal efficiency of the system. When this occurs, higher system temperatures result which leads to frequent activation of over temperature protection (OTP).

FIG. 1 illustrates a conventional axial fan assembly 100, such as may be employed for cooling of a high voltage projector bulb 150 in a slide projector, or for cooling a server chassis. In such applications, sufficient room must be available within the chassis to accommodate the axial fan assembly 100. As shown in FIG. 1, axial fan assembly includes a fan housing 102 that surrounds an axial fan and heat sink 104. In FIG. 1, the axial fan is rotating in a first direction to draw in air though fan inlet 106 and expel the air from fan outlet 108. As shown fan inlet 106 and fan outlet 108 are positioned in line with the rotational axis of the fan and the axial fan moves air through fan assembly 100 in an axial direction, i.e., in a direction parallel and in-line to with the rotational axis of the fan as illustrated by the arrows in FIG. 1. When so rotated, the axial fan draws air into the projector or server system chassis for purposes of dissipating heat from heat generating components therein.

FIG. 2 illustrates the conventional axial fan assembly 100 of FIG. 1 when the axial fan is rotating in a second direction that is opposite to the first direction of FIG. 1. As shown in FIG. 2, air is moved in a direction opposite to that of FIG. 1 when the rotation of the axial fan is reversed such that air is now drawn in though fan outlet 108 and expelled from fan inlet 106, once again in a direction parallel and in-line to with the rotational axis of the fan as illustrated by the arrows in FIG. 2. By so reversing the axial fan direction, air may be expelled from a projector or server system chassis in a manner that removes accumulated dust from the chassis.

Centrifugal fan apparatus in the form of blowers are also employed to cool information handling systems such as notebook computers. Such blowers use a vaned rotor or bladed impeller that rotates within a blower stator housing. Unlike axial fan assemblies, such blowers draw in air at an axial opening near the shaft of the impeller and blow air out an opening that is located circumferentially to the impeller and in a direction that is oriented at a right angle to the direction of air intake. Further, such blowers always intake air from the axial air opening and exhaust the air from the circumferential opening, regardless of the direction of rotation of the impeller. FIG. 3 illustrates an example of a conventional blower assembly 150 having a stator housing 156 with a vaned rotor 154 coupled thereto to rotate about its center axis relative to the stator housing 156. A stator housing cover 160 is configured with an axial air opening 162 defined therein to overlie rotor component 154 when assembled thereto as shown by the dotted lines. An air exhaust opening 159 is shown present for exhausting air from blower 150. Rotor 154 includes angled directional vanes and rotor component is rotatably received within a rotor cavity 158 defined in stator housing 156. Directions of rotor rotation, air intake, and air exhaust for conventional blower 150 are indicated by the arrows in FIG. 3. Such a blower 150 may be installed within the chassis of an information handling system, such as notebook computer, in a manner such that axial air opening 162 extends through an outside wall of the chassis to draw in external cooling air, and such that air exhaust opening 159 exhausts cooing air into the interior of the chassis during blower operation.

SUMMARY OF THE INVENTION

Disclosed herein are dual operation centrifugal fan apparatus and methods of operating same that may be used, for example, to cool the internal heat-generating components of an information handling system or other device. The disclosed dual operation centrifugal fan apparatus may be implemented in one exemplary embodiment as a self-cleaning blower apparatus that is operated in a first normal cooling direction to dissipate heat from internal components of an information handling system, and operated in second cleaning direction to reverse airflow and expel accumulated debris (e.g., dust) from the interior of the information handling system. Advantageously the configuration of the disclosed dual operation centrifugal fan apparatus may be configured in such an embodiment to provide a relatively flat low profile for installation in small or thin form factor applications, e.g., such as inside a portable information handling system such as notebook computer. In another embodiment, a system design may be provided for operating the disclosed dual operation centrifugal fan apparatus that is substantially fault proof and flexible to better tolerate abuse from system users and/or environmental conditions by automatically implementing cleaning cycles, e.g., at regular intervals without need for user intervention.

The disclosed dual operation centrifugal fan apparatus may be provided with a stator housing component having an axial air opening adjacent the center axis of a vaned fan rotor component, and at least first and second circumferential air openings may be defined in the stator housing component beyond the periphery of the rotor component. The axial air opening may be inline with the axis of rotation of the rotor component and serve as an air inlet for the centrifugal apparatus when the rotor is rotating in a first (e.g., cooling) direction. Unlike a conventional axial fan, the circumferential placement of the first and second air openings in the stator peripheral to the rotor component may be implemented to advantageously provide a low blower fan profile to allow for placement in narrow or space-limited areas, such inside a notebook computer chassis.

In one exemplary embodiment, the first circumferential air opening may be configured and positioned to expel air that is drawn from the axial air opening when the rotor component is rotating in a first (e.g., cooling direction), and the second circumferential opening may be configured to expel air drawn from the first circumferential opening when the rotor component is rotating in a second (e.g., cleaning) direction that is opposite in direction from the first direction. In this way a dual operation centrifugal fan apparatus may be provided that reverses air flow direction when the rotation direction of the rotor component is reversed. This is unlike conventional blower apparatus which operate to expel air out of the same circumferential air opening regardless of the rotation direction of the blower rotor.

In one exemplary embodiment, a second circumferential opening of a dual operation centrifugal fan apparatus may be positioned in the stator housing (e.g., adjacent a relatively turbulent area of the stator housing interior) such that minimum or substantially no air leakage into the stator occurs through the second circumferential opening when the rotor component is rotating in the first (e.g., cooling) direction. In a further embodiment, a second circumferential opening may be provided with an optional sealing component (e.g., self-closing flapper door that closes due to inward air pressure differential) to substantially prevent air from being drawn in through the second circumferential opening when the rotor component is rotated in the first direction.

In another exemplary embodiment, a stator housing component may be configured with first and second circumferential air openings that each expel at least some air drawn in from the axial air opening when the rotor component is rotating in both first (e.g., cooling direction) and second (e.g., cleaning) directions. In this regard, the second circumferential opening may be configured and positioned to expel at least a portion of the air drawn from the axial air opening when the rotor component is rotating in the second (e.g., cleaning) direction, while the first circumferential air opening is configured and positioned to expel at least a portion of the air that is drawn from the axial air opening when the rotor component is rotating in a first (e.g., cooling direction), that is opposite in direction from the second direction, with the proviso that for any given blower assembly configuration a relatively greater amount of air is dispelled out the first circumferential opening during cooling rotation than is dispelled out the first circumferential opening during cleaning rotation, and a relatively greater amount of air is dispelled out the second circumferential opening during cleaning rotation than is dispelled out the second circumferential opening during cooling rotation. Thus, even though both first and second circumferential openings exhaust some air regardless of the direction of rotor component rotation in this embodiment, the relative amount of air exhausted by a given circumferential opening may be controlled by selecting direction of rotor component rotation. Due to this change in relative air flow relation between the first and second circumferential openings, at least a portion of accumulated dust (e.g., within the rotor cavity adjacent the first circumferential opening) may be exhausted from the second circumferential opening when the rotor component is reversed to rotate in the second (e.g., cleaning) direction.

In another exemplary embodiment, a system BIOS or other firmware executing on a processing device (e.g., such as an embedded controller) of an information handling system may be provided to automatically and/or selectably switch the rotation of the rotor of a dual operation centrifugal fan apparatus between a first (e.g., cooling) direction and a second cleaning direction to clean dust from the inside of the information handling system chassis and/or stator housing component on a regular or recurring basis. For example, the rotation of the rotor may be set by a processing device to the second (e.g., cleaning) direction for relatively short duration of time to periodically clean dust from the inside of the chassis and/or housing component, e.g., at occurrence of every power up of the information handling system and/or power down of the information handling system. In another example, a processing device may set the rotation of the rotor to the second cleaning direction after a given amount of elapsed operating time in the first (e.g., cooling) direction, i.e., to periodically clean dust from the inside of the information handling system chassis and/or stator housing component on a regular or otherwise timed interval.

In yet other possible examples, the rotation of the rotor may be set by a processing device to the second (e.g., cleaning) direction for relatively short duration of time based upon elevated sensed operating temperature inside the information handling system chassis and/or based upon input from a user of the information handling system, e.g., via graphical user interface and/or input/output device such as function key of the keyboard. Alternatively, the rotation of the rotor may be set by a processing device to the second (e.g., cleaning) direction for relatively short duration of time based upon detection of the accumulation of a predetermined amount of dust within the information handling system chassis using dust detection circuitry and/or methodology as described in U.S. Pat. No. 7,262,704, which is incorporated herein by reference in its entirety. Thereafter the rotation of the rotor may be returned to the first cooling direction.

In one respect, disclosed herein is an information handling system, including a chassis enclosing one or more information handling system components, the chassis having at least one gas intake opening defined in an outer surface of the chassis, and at least one cleaning gas exhaust opening defined in an outer surface of the chassis; and at least one centrifugal fan apparatus coupled to the chassis. The centrifugal fan apparatus may include: a stator housing component and a vaned rotor component rotatably received therein, a rotor driver mechanically coupled to drive the vaned rotor component in a first cooling direction and a second cleaning direction that is opposite in rotation from the first cooling direction, a first circumferential opening defined in the stator housing, the first circumferential opening configured to act as a gas outlet for expelling gas into an interior space of the chassis for cooling the information handling system components when the vaned rotor component rotates in a first cooling direction, a second circumferential opening defined in the stator housing, the second circumferential opening coupled to the at least one cleaning gas exhaust opening defined in the outer surface of the chassis and being configured to act as a gas outlet for expelling gas outside of the chassis when the vaned rotor component rotates in a second cleaning direction that is opposite in rotation from the first cooling direction, and an axial gas opening defined in the stator housing component over the vaned rotor component, the second circumferential opening coupled to the at least one gas intake opening defined in the outer surface of the chassis, and the axial gas opening configured to act as a gas inlet for drawing in gas from outside the chassis when the vaned rotor component rotates in the first cooling direction.

In another respect, disclosed herein is a centrifugal fan apparatus, including: a stator housing component and a vaned rotor component rotatably received therein; a first circumferential opening defined in the stator housing, the first circumferential opening configured to act as a gas outlet when the vaned rotor component rotates in a first direction; a second circumferential opening defined in the stator housing, the second circumferential opening configured to act as a gas outlet when the vaned rotor component rotates in a second direction that is opposite in rotation from the first direction; and an axial gas opening defined in the stator housing component over the vaned rotor component, the axial gas opening configured to act as a gas inlet when the vaned rotor component rotates in the first direction.

In yet another respect, disclosed herein is a method of operating an information handling system, including: providing a chassis enclosing one or more information handling system components, the chassis having at least one gas intake opening defined in an outer surface of the chassis, and at least one cleaning gas exhaust opening defined in an outer surface of the chassis; and providing at least one centrifugal fan apparatus coupled to the chassis. The centrifugal fan apparatus may include: a stator housing component and a vaned rotor component rotatably received therein, a first circumferential opening defined in the stator housing and configured to act as a gas outlet for expelling gas into an interior space of the chassis, a second circumferential opening defined in the stator housing, the second circumferential opening coupled to the at least one cleaning gas exhaust opening defined in the outer surface of the chassis, and an axial gas opening defined in the stator housing component over the vaned rotor component, the second circumferential opening coupled to the at least one gas intake opening defined in the outer surface of the chassis. The method may include rotating the vaned rotor component in a first cooling direction to draw in gas from the at least one gas intake opening defined in the outer surface of the chassis through the axial gas opening defined in the stator housing component, and to expel the drawn in gas into the interior space of the chassis through the first circumferential opening defined in the stator housing for cooling the information handling system components; and rotating the vaned rotor component in a second cleaning direction to expel drawn in gas from the second circumferential opening defined in the stator housing out through the cleaning gas exhaust opening to expel gas outside of the chassis.

DESCRIPTION OF ILLUSTRATIVE EMBODIMENTS

Figure 2:
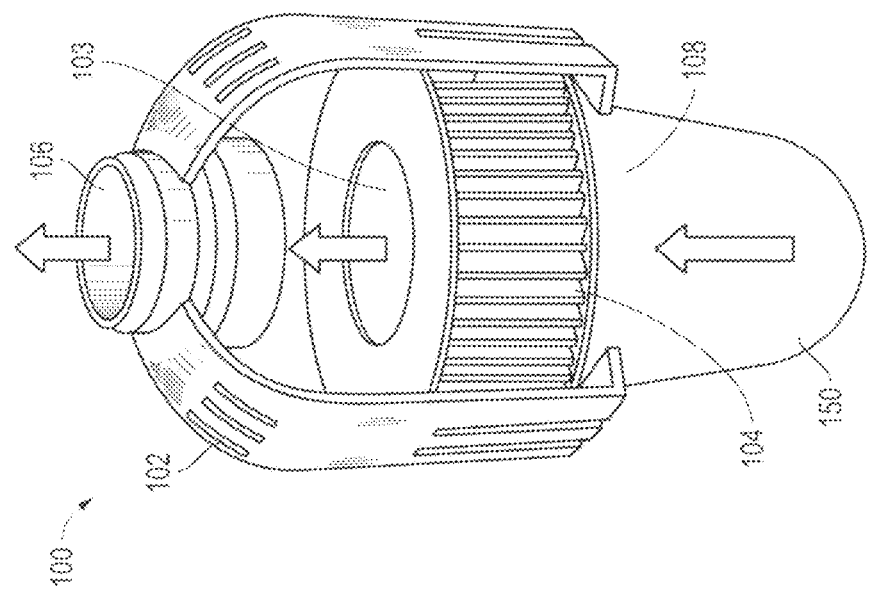
FIG. 2 illustrates perspective view of a conventional axial fan assembly.
Figure 1:
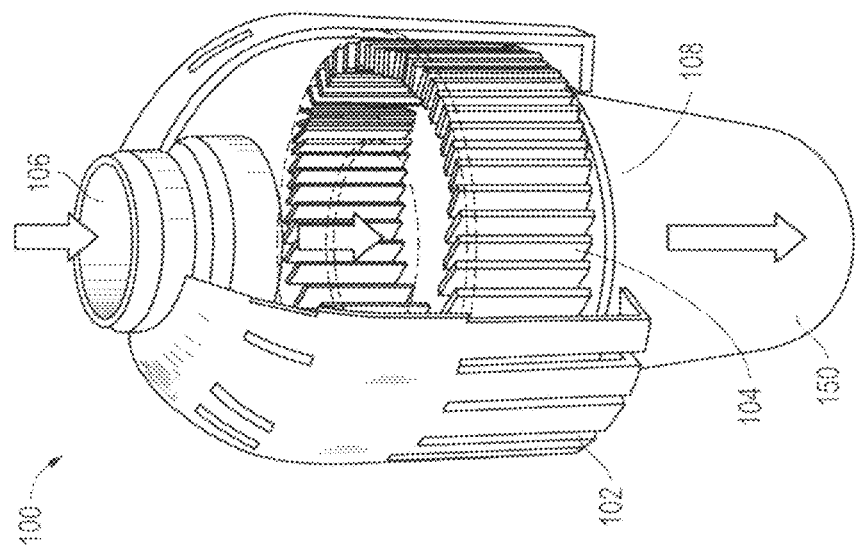
FIG. 1 illustrates a perspective view of a conventional axial fan assembly.
Figure 3:
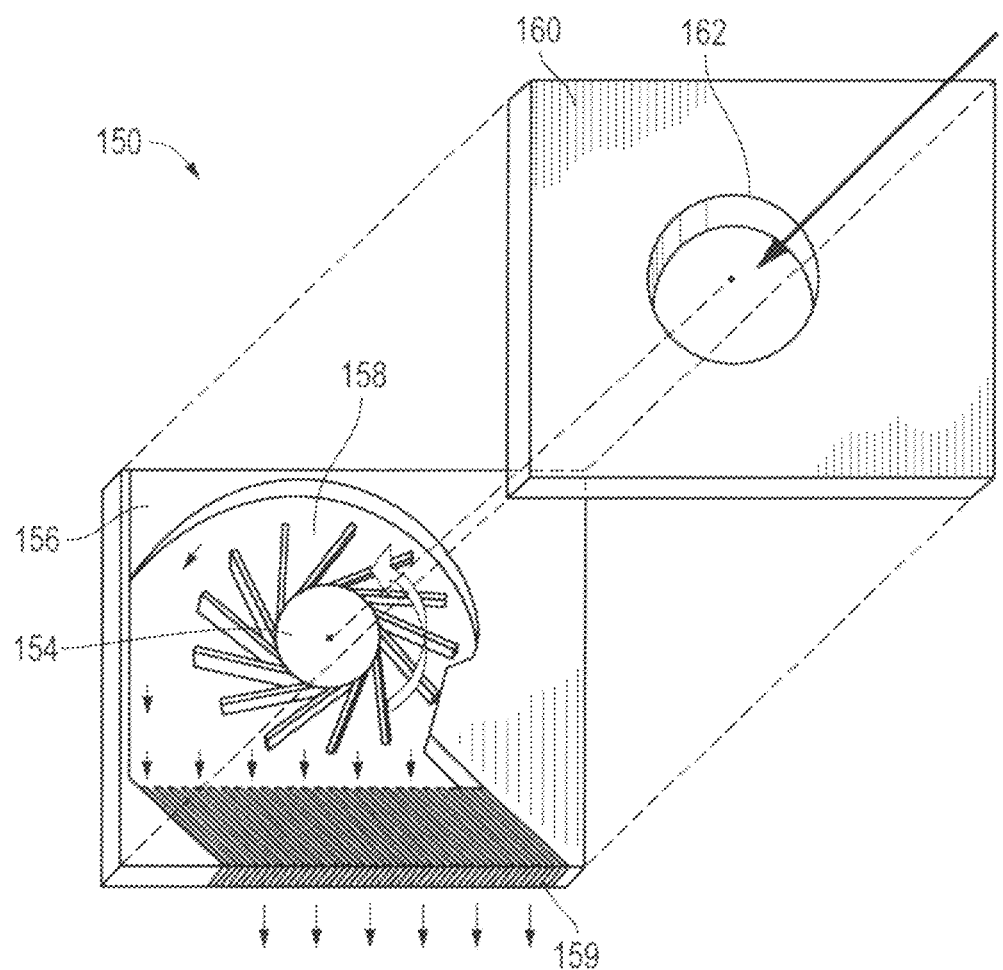
FIG. 3 illustrates an exploded perspective view of a conventional blower assembly.
Figure 4:
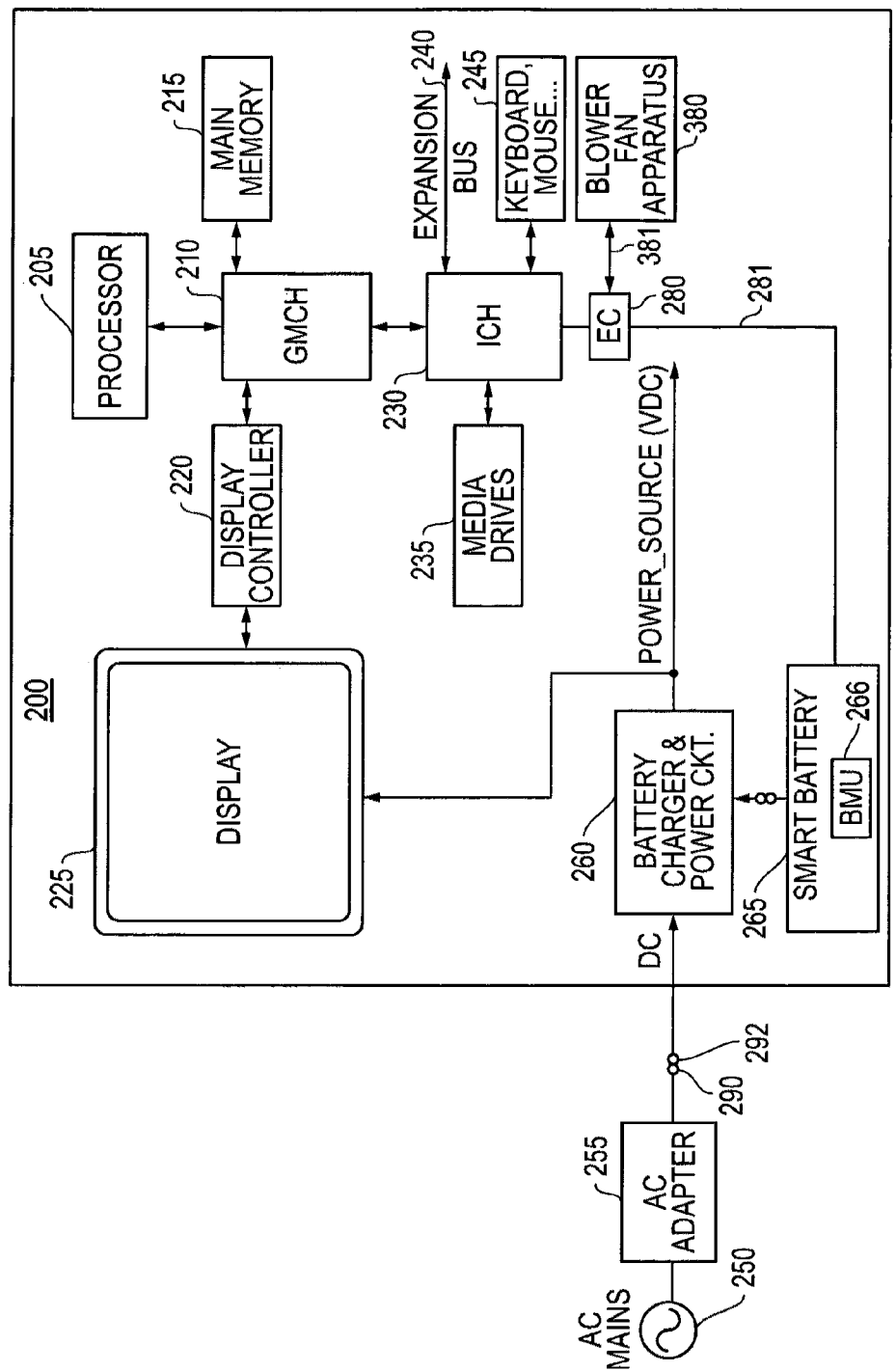
FIG. 4 is a block diagram of an information handling system according to one exemplary embodiment of the disclosed systems and methods.

FIG. 4 is a block diagram of an information handling system 200 (e.g., portable information handling system such as notebook computer, MP3 player, personal data assistant (PDA), cell phone, cordless phone, etc.) as it may be configured according to one exemplary embodiment of the disclosed systems and methods. As shown in FIG. 4, information handling system 200 of this exemplary embodiment includes a processor 205 such as an Intel Pentium series processor, an Advanced Micro Devices (AMD) processor or one of many other processors currently available. A graphics/memory controller hub (GMCH) chip 210 is coupled to processor 205 to facilitate memory and display functions. System memory 215 and a display controller 220 are coupled to GMCH 210. A display device 225 (e.g., video monitor) may be coupled to display controller 220 to provide visual images (e.g., via graphical user interface) to the user. An I/O controller hub (ICH) chip 230 is coupled to GMCH chip 210 to facilitate input/output functions for the information handling system. Media drives 235 are coupled to ICH chip 230 to provide permanent storage to the information handling system. An expansion bus 240 is coupled to ICH chip 230 to provide the information handling system with additional plug-in functionality. Expansion bus 240 may be a PCI bus, PCI Express bus, SATA bus, USB or virtually any other expansion bus. Input devices 245 such as a keyboard and mouse are coupled to ICH chip 230 to enable the user to interact with the information handling system. An embedded controller (EC) 280 running system BIOS is also coupled to ICH chip 230.

In this particular embodiment, information handling system 200 is coupled to an external source of power, namely AC mains 250 and AC adapter 255. It will be understood that external power may alternatively provided from any other suitable external source (e.g., external DC power source) or that AC adapter 255 may alternatively be integrated within an information handling system 200 such that AC mains 250 supplies AC power directly to information handling system 200. As shown AC adapter 255 is removably coupled to, and separable from, battery charger/power circuit 260 of information handling system 200 at mating interconnection terminals 290 and 292 in order to provide information handling system 200 with a source of DC power to supplement DC power provided by battery cells of a battery system in the form of smart battery pack 265, e.g., lithium ion ("Li-ion") or nickel metal hydride ("NiMH") battery pack including one or more rechargeable batteries and a BMU that includes an analog front end ("AFE") and microcontroller. Further, a battery system data bus (SMBus) 281 is coupled to smart battery pack 265 to provide battery state information, such as battery voltage and current information, from BMU 266 of smart battery pack 265 to EC 280. Battery charger/power circuit 260 of information handling system 200 may also provide DC power for recharging battery cells of the battery system 265 during charging operations.

FIG. 4 further shows a centrifugal fan apparatus configured in the form of a self-cleaning blower apparatus 380 that is coupled to EC 280 by a control signal (e.g., communication bus) 381 to allow EC 280 and system BIOS executing thereon to selectably control rotation and direction of rotation of a vaned rotor or bladed impeller of blower apparatus 380 in a manner as will be described further herein. It will be understood that the embodiment of FIG. 4 is exemplary only and that additional, fewer, and/or alternative components may be present in an information handling system of other embodiments. It will also be understood that any one or more other suitable other processing devices (e.g., controller, microcontroller, CPU, ASIC, FPGA, etc.) and software/firmware executing thereon may be alternatively employed to control operation of blower apparatus 380 in other embodiments.

Figure 5:
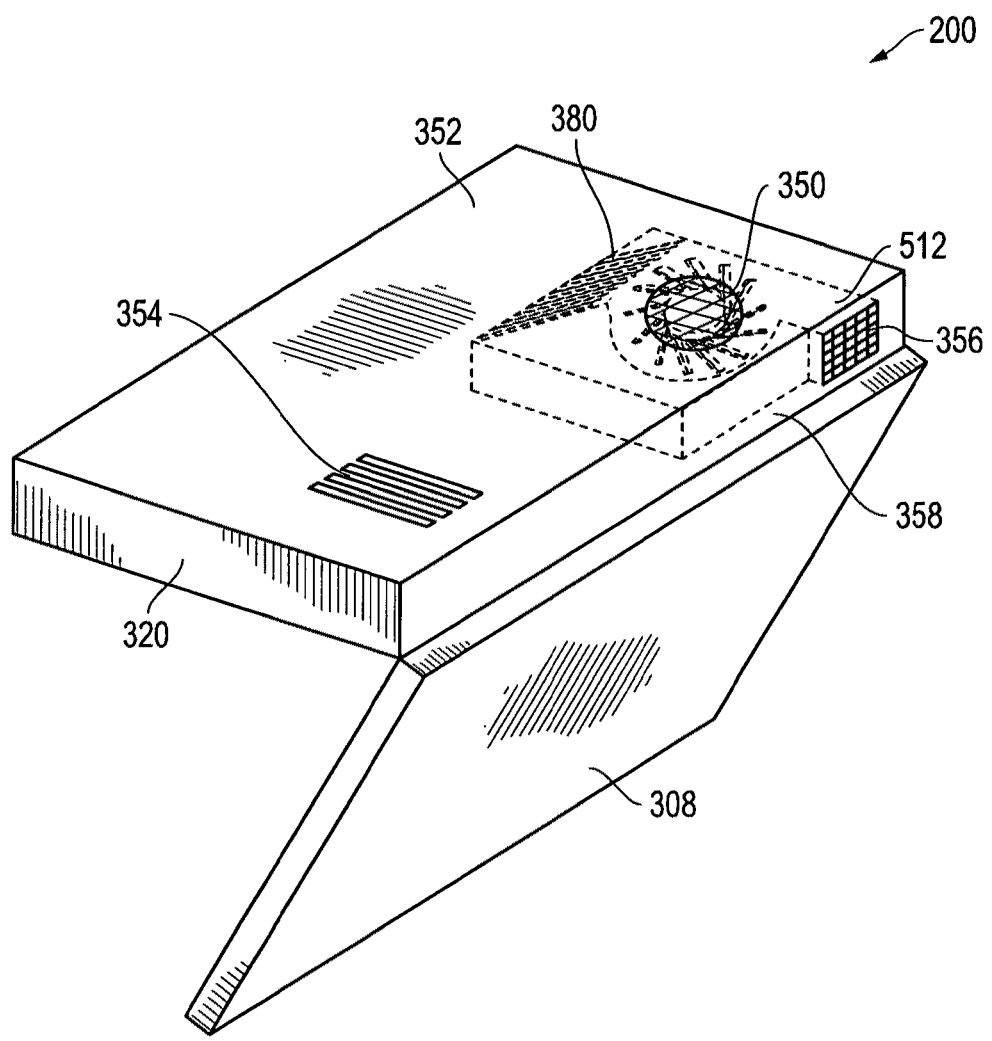
FIG. 5 illustrates a perspective view of an information handling system according to one exemplary embodiment of the disclosed apparatus and methods.

FIG. 5 illustrates a perspective view of one exemplary embodiment of portable information handling system 200 as it may be configured as a notebook computer. As shown in FIG. 5, notebook computer 200 includes a lid chassis portion 308 with display (e.g. LCD or LED display) that is hingeably coupled to a base chassis portion 320 that in this embodiment includes input/output devices (e.g., such as a keyboard, touchpad, etc.) and that internally encloses or contains information handling system components (e.g., system processor 205, main memory 215, media drives 235, battery charger and power circuit 260, smart battery 265, etc.) described in relation to FIG. 4. As further shown in FIG. 5, notebook computer 200 includes an air intake opening 350 defined in the underside surface 352 of base chassis portion 320 for a self-cleaning blower apparatus 380 (shown in dashed outline) that is provided inside notebook computer 200 for purposes of drawing in air to cool internal components of notebook computer 200. Further shown in FIG. 5 are cooling air exhaust openings 354 defined in the underside surface 352 of base portion 320 for allowing circulated cooling air provided by self-clean blower apparatus 380 to escape. Also present is cleaning air exhaust opening 356 defined on a backside surface 358 of base portion 320.

As will be described further herein, self-cleaning blower apparatus 380 draws in air through cooling air intake opening 350 when its rotor is rotated in a first cooling direction and supplies this cooling air to the interior of information handling system base chassis portion 320 for cooling the components therein. The cooling air is then dispelled from base chassis portion 320 through cooling air exhaust openings 354. When its rotor is rotated in second cleaning direction, self-cleaning blower apparatus 380 draws air from the interior of base chassis portion 320 and exhausts this cleaning air through cleaning air exhaust opening 356 in one embodiment, or draws in air through cooling air intake opening 350 and preferentially exhausts this cleaning air through cleaning air exhaust opening 356 in another embodiment. In the first aforementioned embodiment, the action of drawing air from the interior of base chassis portion 320 acts to dislodge and remove dust and other debris that may have been carried in by cooling air and accumulated inside base chassis portion 320 when the rotor of the self-cleaning blower apparatus 380 is operating in its normal first cooling direction. In the second aforementioned embodiment, the action of exhausting air preferentially through cleaning air exhaust opening 356 acts to dislodge and remove dust and other debris that may have been carried in by cooling air and accumulated inside the stator housing component of the blower apparatus 380 when the rotor of the self-cleaning blower apparatus 380 is operating in its normal first cooling direction.

It will be understood that the embodiment of FIG. 5 is exemplary only, and that a self-cleaning blower apparatus 380 may implemented to cool other types of information handling system chassis (e.g., desktop computer chassis, server chassis, etc.) or other types of chassis (e.g., stereo chassis, refrigerator chassis, electric welder chassis, etc.). Further, the relative positioning and configuration of blower apparatus 380, and openings 350, 354 and 356 are exemplary only and may varied in location and/or number, size, shape, etc.

Figure 6:
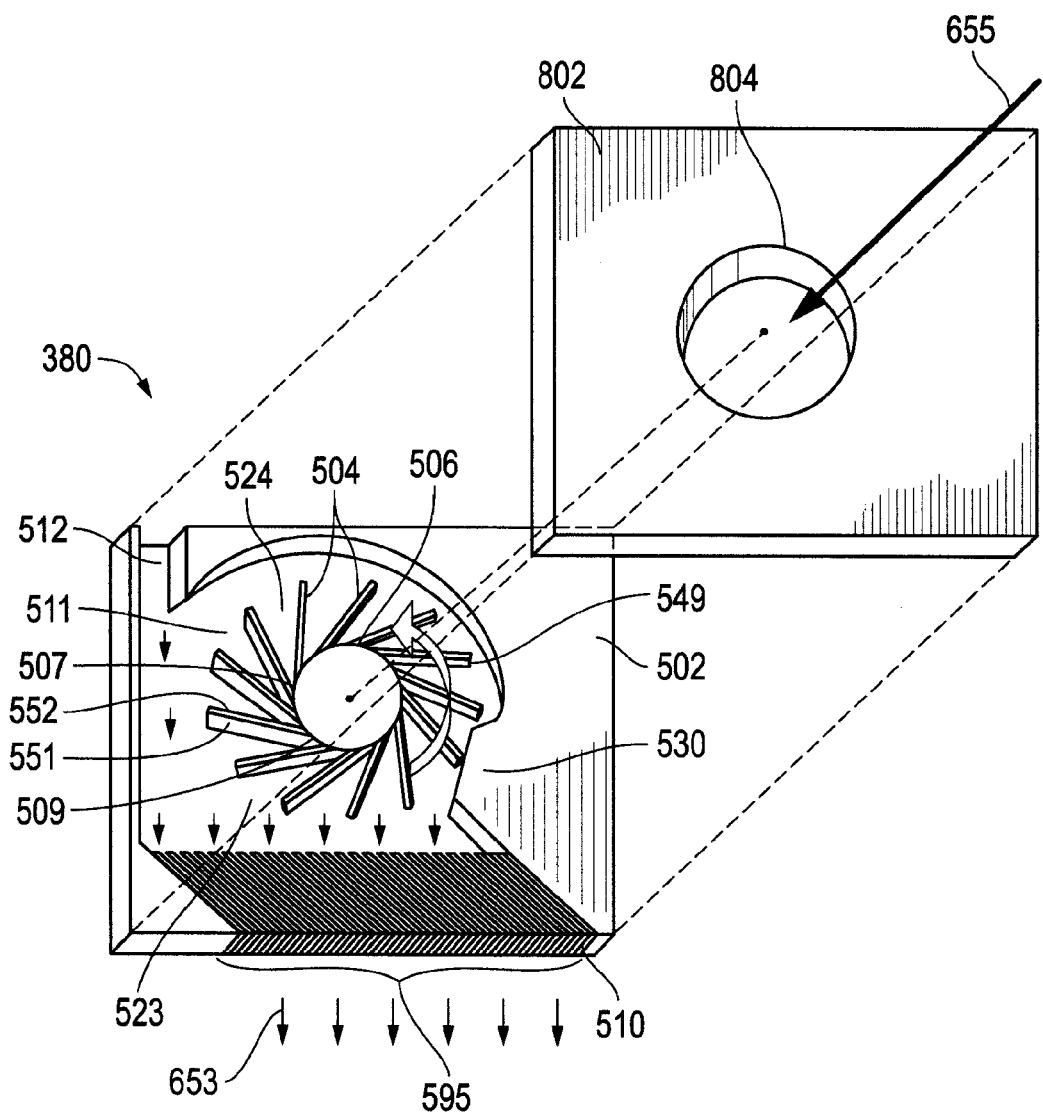
FIG. 6 illustrates a dual operation centrifugal fan apparatus according to one exemplary embodiment of the disclosed apparatus and methods.
Figure 7:
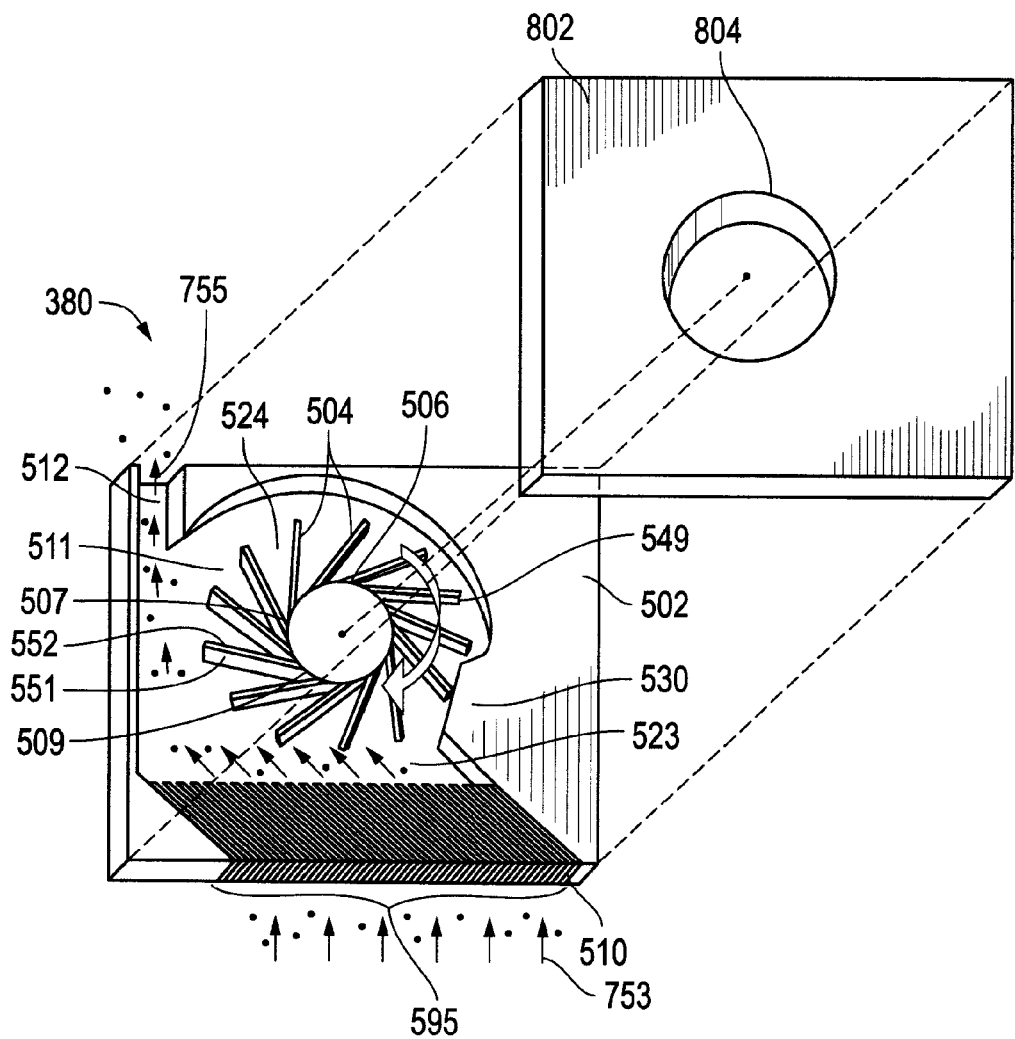
FIG. 7 illustrates a dual operation centrifugal fan apparatus according to one exemplary embodiment of the disclosed apparatus and methods.

FIGS. 6 and 7 illustrate a dual operation centrifugal fan apparatus 380 as it may be configured according to one exemplary embodiment of the disclosed apparatus and methods. It will be understood that although described in relation to an embodiment of a self-cleaning blower apparatus (e.g., for air cooling an information handling system chassis or other air cooling operation), the dual operation centrifugal fan apparatus described for the embodiments herein may be employed for any other gas-circulating purpose, and may be employed to circulate other types of gas besides air, e.g., oxygen, nitrogen, carbon dioxide, etc.

As shown in FIGS. 6 and 7, self-cleaning blower apparatus 380 includes a stator housing component 502 with a vaned rotor component 509 coupled thereto to rotate about its center axis 506 relative stator component 502. The rotating center of rotor component 509 may be exposed or may be covered by a stationary plate. In FIGS. 6 and 7, one side (e.g., stator housing cover) of stator housing component 502 that overlies rotor component 509 is shown removed for illustration purposes. As shown, rotor component 509 includes angled directional vanes 504 that radiate from a central rotor member 507, and rotor component is rotatably received within a rotor cavity 511 defined in stator housing component 502 that has a closed side that substantially conforms to the outer peripheral shape of vaned rotor component 509. Rotor cavity 511 also includes an open side 523 that does not conform to the outer peripheral shape of vaned rotor 509 and that is open to and contiguous with a first circumferential opening 510 defined in the body of the stator housing component 502 that will be further discussed below. Rotor cavity 511 also includes a closed side 524 that is defined between the body of stator housing component 502 and rotor component 509. Closed side 524 terminates as shown at a blocking surface 530 of the body of stator housing component 502 which is conformably located adjacent the outer periphery of rotation of vaned rotor component 509 to from a dynamic pneumatic seal that substantially blocks air flow (i.e., prevents bypass airflow) between the outer periphery of vaned rotor 509 and blocking surface 530.

It will be understood that each of rotor component 509 and stator housing component 502 may be manufactured of metal, plastic, combinations thereof, etc. Not shown in FIGS. 6 and 7 is a rotor driver (e.g., an electric fan motor) that is mechanically coupled to drive rotor component 509 in a first counterclockwise cooling direction as shown by the arrow in FIG. 6, and a second and opposite clockwise direction as shown by the arrow in FIG. 7.

Figure 8:
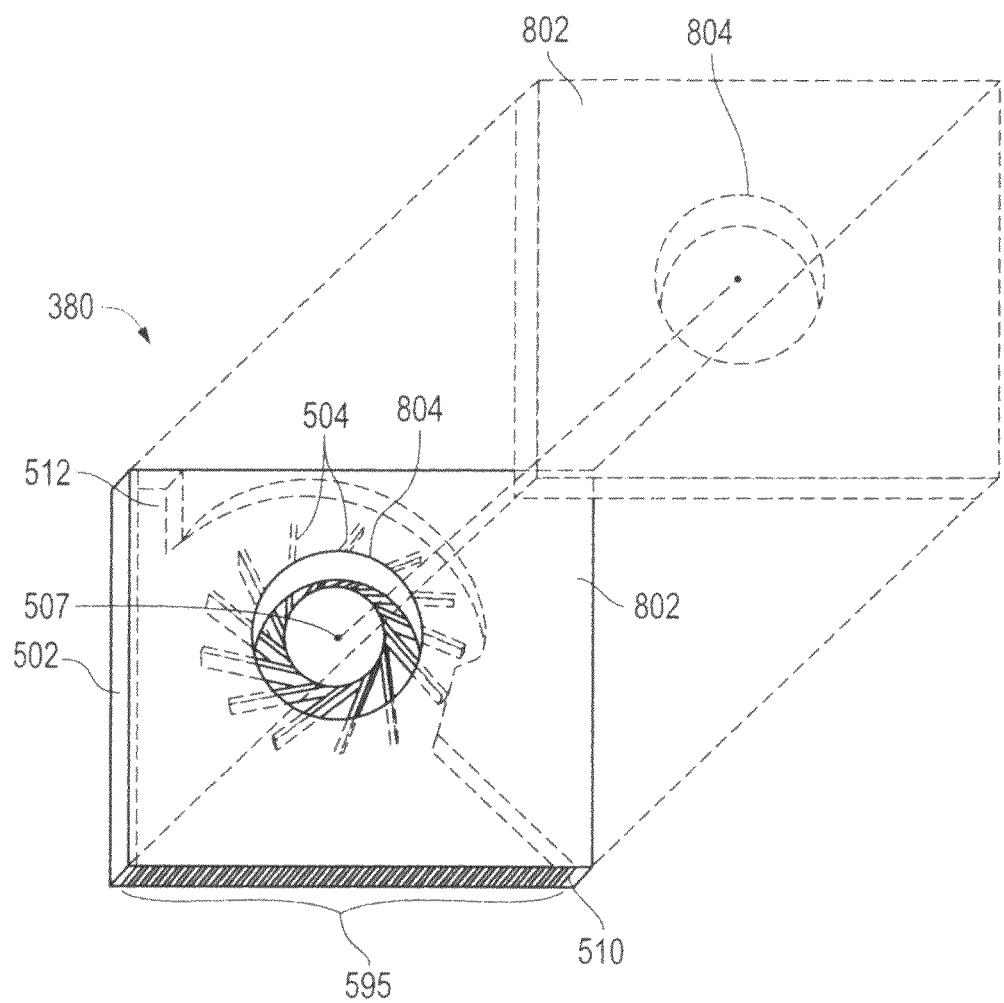
FIG. 8 illustrates a dual operation centrifugal fan apparatus according to one exemplary embodiment of the disclosed apparatus and methods.

As previously mentioned, a stator housing cover 802 of stator housing component 502 has been omitted from view in the previous figures. A stator housing component 502 may include a stator housing cover 802 that is formed as an integral feature with the remainder of stator housing component 502, or may include a stator housing cover 802 that is formed as a separate piece from the remainder of stator housing component 502. As shown in FIG. 8, stator housing cover 802 is configured to cover and at least partially enclose rotor cavity 511, and includes an axial air opening 804 substantially centered over central rotor member 507 that functions as an air inlet for cooling air when rotor component rotates in its first counterclockwise cooling direction, it being understood that an axial air opening may be alternatively positioned in other way over central rotor member 507 suitable to allow air to be drawn in through the axial air opening by the rotating central rotor member 507. As may be seen in the exemplary embodiment of FIG. 8, a portion of rotor vanes 504 are overlain and exposed by axial air opening 804 through which air is drawn in by self-cleaning blower apparatus 380 in a manner as will be described further herein. In the embodiment of FIG. 5, the stator housing cover may be formed by the underside surface 352 base chassis portion 320 of notebook computer 200 with air intake opening 350 being defined in the underside surface 352 of base chassis portion 320 and substantially centered around central rotor member 507 as shown to function as axial air opening 804 and as a cooling air inlet for blower apparatus 380. FIG. 8 also shows stator housing cover 802 in dashed-line exploded perspective view as it would appear if disassembled from stator housing component 502.

As further shown in FIGS. 6 and 7, a first circumferential opening 510 is defined in the periphery of stator housing 502 adjacent and continuous with open side 523 of rotor cavity 511. As shown, an optional grill or a heat exchanger fin assembly 595 may be optionally present across first circumferential opening 510. First circumferential opening 510 functions as an air outlet when rotor component 509 rotates in its first counter clockwise cooling direction toward the direction of the angle orientation of vanes 504. When rotated in this direction, the angle of directional vanes 504 acts to draw in air 655 through axial air opening 804 by virtue of an area of lower air pressure created in closed side 524 of rotor cavity 511 due to a pneumatic seal dynamically formed by blocking surface 530 with the distal ends 549 of vanes 504 during rotation. The rotating action of rotor 509 creates centrifugal force that dispels air 653 at first circumferential opening 510 in a direction that is oriented 90 degrees from the direction that the air 655 is taken in through axial air opening 804. First circumferential opening 510 is faced by the oncoming angled front side face 551 of vanes 504 as they move toward open side 523 of rotor cavity 511 against blocking surface 530, which acts to create an area of higher pressure that forces the air 653 out first circumferential opening 510. When employed in the exemplary information handling system embodiment of FIG. 5, first circumferential opening 510 may communicate with the interior of base chassis portion 320 to allow blower apparatus 380 to supply cooling air drawn in through air intake opening 350 through first circumferential opening 510 to the interior components of base chassis portion 320 as shown in FIG. 6.

Also illustrated in FIGS. 6 and 7 is a second circumferential opening 512 that is also defined in the periphery of stator housing 502 adjacent and that in this embodiment is open and contiguous with open side 523 of rotor cavity 511. Second circumferential opening 512 functions as an air outlet for blower apparatus 380 when rotor component 509 rotates in its second clockwise cleaning direction as shown in FIG. 7. When so rotated, the angled face 552 of directional vanes 504 acts to draw in air 753 at first circumferential opening 510 as a result of an area of low pressure created in open side 523 of rotor cavity 511 between first circumferential opening 510 and rotor component 509 due to the dynamic pneumatic seal formed between the ends 509 of rotor vanes 504 and blocking area 530. This air drawn in is forced out as air 755 through second circumferential opening 512 due to an area of high pressure created in closed side 524 of rotor cavity 511 as the oncoming angled back side face 552 of vanes 504 move through closed side 524 of rotor cavity 511 against blocking surface 530. The size and shape of second circumferential opening 512 may be selected as needed to fit the air flow requirements of a particular application, e.g., to have sufficient cross-sectional area to exhaust maximum airflow provided by rotor component 509 when rotating in its second clockwise cleaning direction. It will be understood that the particular directional orientation of rotor vanes 504 is exemplary only, and that vanes 504 may be oriented to face the opposite direction to provide a clockwise cooling rotation (e.g., air intake through an axial inlet and air exhausted out a first circumferential opening) and a counter clockwise cleaning rotation (e.g., air intake through a first circumferential opening and air exhausted out a second circumferential opening).

In one exemplary embodiment, a user and/or system BIOS executing on embedded controller 280 of information handling system 200 may be provided to automatically and/or selectably control the direction of rotation of rotor component 509 of self-cleaning blower apparatus 380 to temporarily switch rotation of rotor component 509 from the normal first cooling direction to a second cleaning direction to clean dust from the inside of base chassis portion 320 of information handling system 200, e.g., in response to manual user input, automatic algorithm steps, etc. For example a user may be allowed to initiate a temporary cleaning mode in which rotor component 509 temporarily switches from the normal first cooling direction rotation to the second cleaning direction, e.g., by input via function keystrokes input to keyboard 245 and/or by graphical user interface on display 225. A utility may be optionally provided executing on processor 205 and/or embedded controller 280 that periodically reminds the user to implement the temporary cleaning mode. The duration of the second cleaning direction rotation of the temporary cleaning mode may be controlled by the user and/or automatically by timed algorithm (executing, for example, on embedded controller 280) prior to returning to the normal first cooing direction. Duration of second cleaning direction may be, for example, 5 to 10 seconds or any other suitable greater or lesser amount of time. An example automatic cleaning schedule would be two hours of first cooling direction rotation followed by 10 seconds of second cleaning direction rotation, before reversing rotation for two more hours of first cooling direction rotation.

Alternatively or additionally, system BIOS may initiate the second cleaning direction rotation of rotor component 509 on a regular or recurring basis, e.g., by implementation of an algorithm that temporarily switches the rotation of rotor component 509 from the normal first cooling direction to the second cleaning direction. For example, the rotation of the rotor component 509 may be temporarily set by BIOS executing on embedded controller 280 to the second cleaning direction for a relatively short duration of time (e.g., from about 30 seconds to about 1 minute or any other suitable time) to periodically clean dust from the inside of base chassis portion 320, e.g., at occurrence of every boot up or power up of the information handling system 200 and/or power down of the information handling system 200. For example, in one exemplary embodiment at every initial system boot the rotor component 509 may go idle (e.g., for about two seconds) after running in the first cooling direction at full speed (e.g., at about 4000 RPM) for a short period of time. It may then reverse to run in the second cleaning direction rotation (e.g., at about 2000 RPM) for about 15 seconds. It will be understood that these time and rotational speed parameters are exemplary and illustrative only.

In another example, BIOS executing on embedded controller 280 may temporarily set the rotation of rotor component 509 from the first cooling direction to the second cleaning direction to periodically clean dust from the inside of the information handling system base chassis portion 320 on an automatic timed interval. For example, BIOS executing on embedded controller 280 may temporarily set the rotation of rotor component 509 to the second cleaning direction after a given amount of cumulative elapsed operating time (e.g., from about 6 to about 12 hours or any other suitable time) in the first cooling direction, and then re-set the rotation of rotor component 509 back to the second cleaning direction after a short duration of cleaning time (e.g., from about 30 seconds to about 1 minute or any other suitable time). In yet other possible examples, the rotation of rotor component 509 may be temporarily set by system BIOS to the second cleaning direction for relatively short duration of time (e.g., from about 30 seconds to about 1 minute or any other suitable time) based upon sensed operating temperature exceeding a high temperature threshold inside the information handling system chassis (e.g., sensed by a temperature sensor coupled to a processing device and positioned within base chassis portion 320). Thereafter the rotation of rotor component 509 may be returned to the normal first cooling direction.

In one exemplary embodiment, a status indicator (e.g., dual color LED or other type of visual and/or audio indicator) may be provided to inform a user in real time of the information handling system of the current operational mode (e.g., cooling or cleaning fan rotation). For example a dual color LED indicator may be provided as one of the "dashboard" visual indicators of a notebook computer, or may be positioned adjacent cleaning and/or cooling exhaust openings of the information handling system. The status indicator may be lit with either a first or second color to indicate which corresponding respective fan rotation mode (cooling or cleaning) is currently in operation.

It will be understood that the preceding examples are exemplary only, and that any combination of user action, embedded controller 280, processor 205 and/or other processing device may be employed to implement temporary cleaning cycles using any suitable methodology or algorithm. Further, it will be understood that where multiple fan speeds are employed for a self-cleaning blower apparatus 380, the highest fan speed may be automatically selected in one embodiment for the second cleaning direction operation of rotor component 509.

When employed in the exemplary information handling system embodiment of FIG. 5, second circumferential opening 512 may be coupled in communication with cleaning air exhaust opening 356 to allow cleaning air drawn in from the interior of base chassis portion 320 through first circumferential opening 510 to be expelled through air exhaust opening 356. As previously mentioned, this action of drawing air from the interior of base chassis portion 320 acts to dislodge and remove dust and other debris that may have been carried in by cooling air and accumulated inside base chassis portion 320 when the rotor of self-cleaning blower apparatus is operating in its normal first cooling direction. It will be understood, however, that the disclosed self-cleaning blower apparatus may be employed for a variety of air moving purposes, including for applications not involving cooling and/or use in information handling systems.

Figure 9:
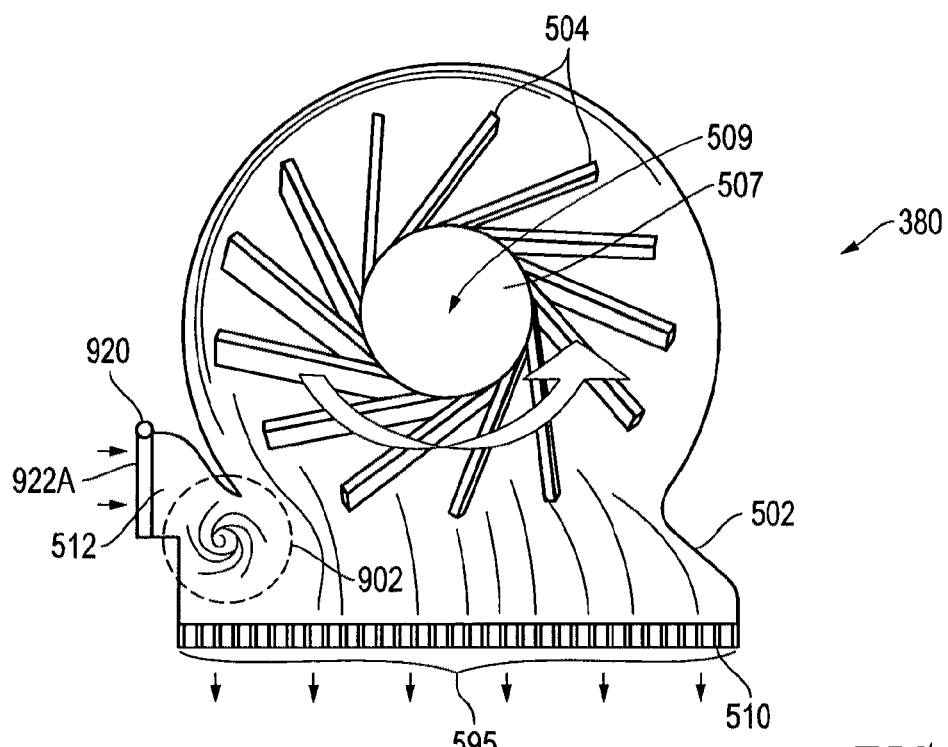
FIG. 9 illustrates a dual operation centrifugal fan apparatus according to one exemplary embodiment of the disclosed apparatus and methods.

It will be understood that the particular relative locations of first and second circumferential openings 510 and 512 relative to stator housing 502 in FIGS. 6-8 are exemplary only, and that other locations and/or configurations are possible. For example, FIG. 9 is a cut-away view of an alternative embodiment of self-cleaning blower apparatus 380 in which a second circumferential opening 512 may be defined in stator housing component 502 adjacent a relatively turbulent "blocking" region 902 of the stator housing interior such that minimum or substantially no air leakage occurs into the stator housing through second circumferential opening 512 when vaned rotor component 509 is rotating in the first cooling direction due to formation of turbulent vortex or other air flow phenomenon adjacent second circumferential opening 512. Location/s for such a turbulent blocking region may be found, for example, based on empirical test data of blower apparatus of different configurations, by airflow modeling, etc.

Figure 10:
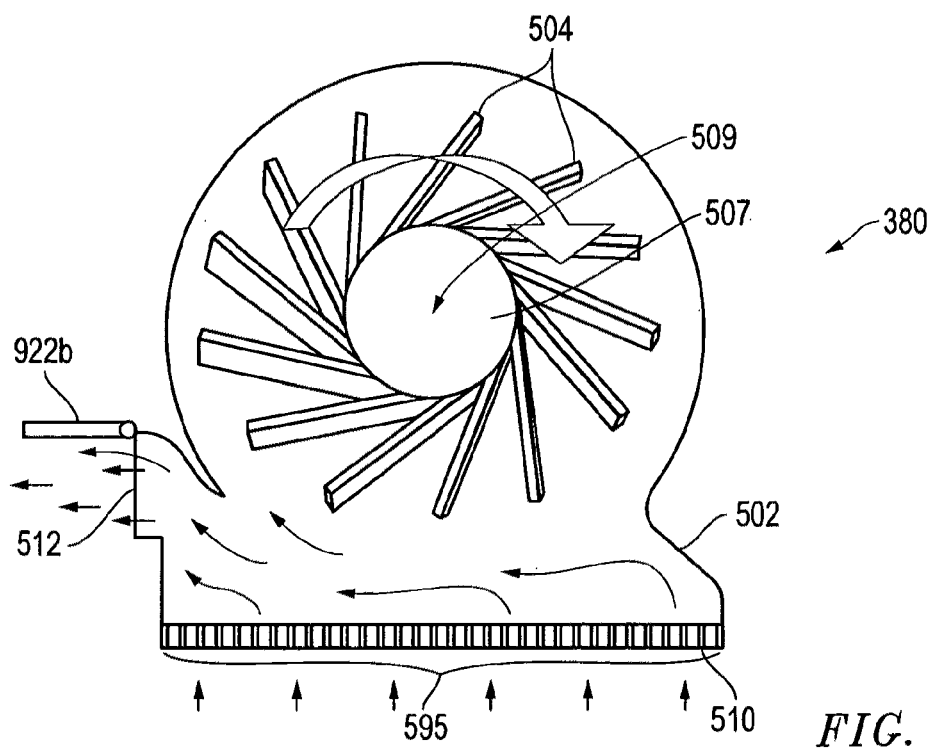
FIG. 10 illustrates a dual operation centrifugal fan apparatus according to one exemplary embodiment of the disclosed apparatus and methods.

In a further embodiment, second circumferential opening 512 may be provided with an optional sealing component (e.g., self-closing flapper door 922 that closes due to inward air pressure differential across opening 512) to prevent air from being drawn in through the second circumferential opening 512 when rotor component 509 is rotating in the first cooling direction. In the illustrated embodiment of FIG. 9, flapper door 922 (e.g., constructed of rubber, plastic, sheet metal, etc.) is illustrated in closed position while rotor component 509 is rotating in the counter clockwise first cooling direction. Upon reversal of rotation of rotor component 509 to the second cleaning direction, air pressure forces flapper door 922 into an open position 922*b* around hinge 920 as shown in FIG. 10 to allow air to be expelled out second circumferential opening 512 while rotor component 509 is rotating in the clockwise second cleaning direction. An optional closing mechanism, e.g., spring loaded hinge or motorized door actuator, may be provided to help keep flapper door 922 in closed position when rotor component 509 is rotating in the first cooling direction. It will be understood that any other configuration of sealing mechanism may be employed for selectably preventing air from being drawn in through the second circumferential opening 512 when rotor component 509 is rotating in its first cooling direction.

Figure 11:
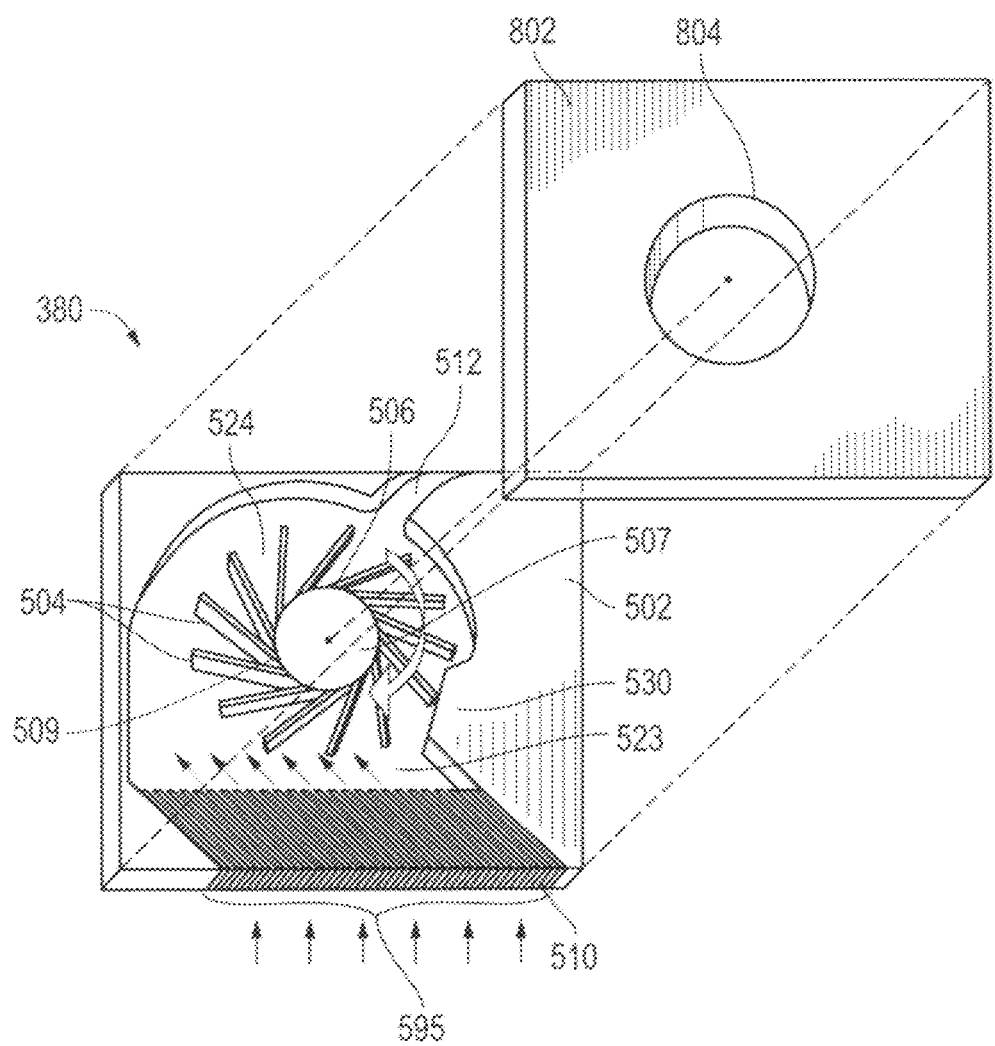
FIG. 11 illustrates a dual operation centrifugal fan apparatus according to one exemplary embodiment of the disclosed apparatus and methods.
Figure 12:
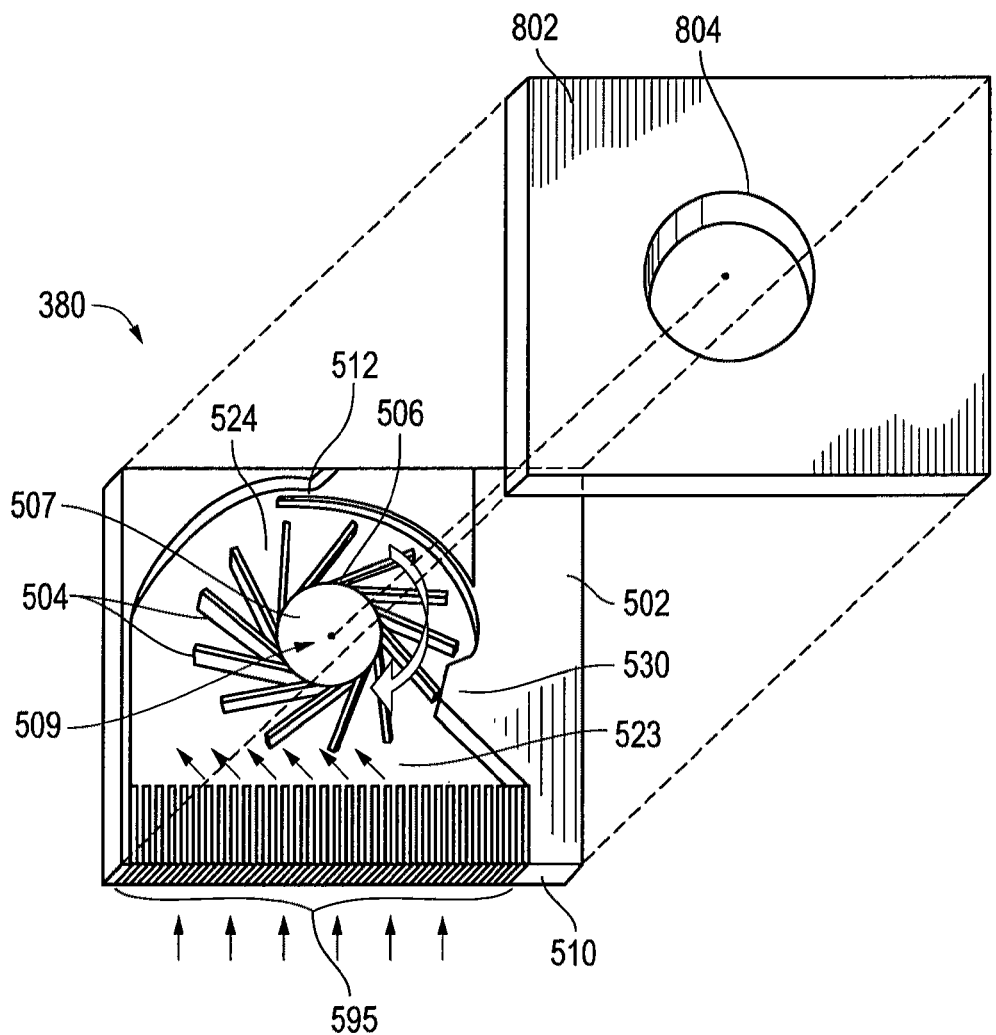
FIG. 12 illustrates a dual operation centrifugal fan apparatus according to one exemplary embodiment of the disclosed apparatus and methods.

FIGS. 11-12 illustrate just a few possible alternative embodiments of self-cleaning blower apparatus 380 having varying locations of second circumferential opening 512 defined in the periphery of stator housing 502 adjacent and continuous with open side 523 of rotor cavity 511. In this regard, the a particular location for second circumferential opening 512 may be chosen, for example, to fit form factor or other dimensional requirements or a particular application (e.g., particular chassis design). In the event that a selected location for second circumferential opening 512 does not coincide with a turbulent "blocking" region 902, an optional sealing mechanism (e.g., self-closing flapper door 922) may be provided to prevent air from being drawn in through the second circumferential opening 512 when rotor component 509 is rotating in the first cooling direction. It will also be understood that more than one first circumferential opening 510 and/or more than one second circumferential opening 512 may be present in a stator housing component 502.

Figure 13:
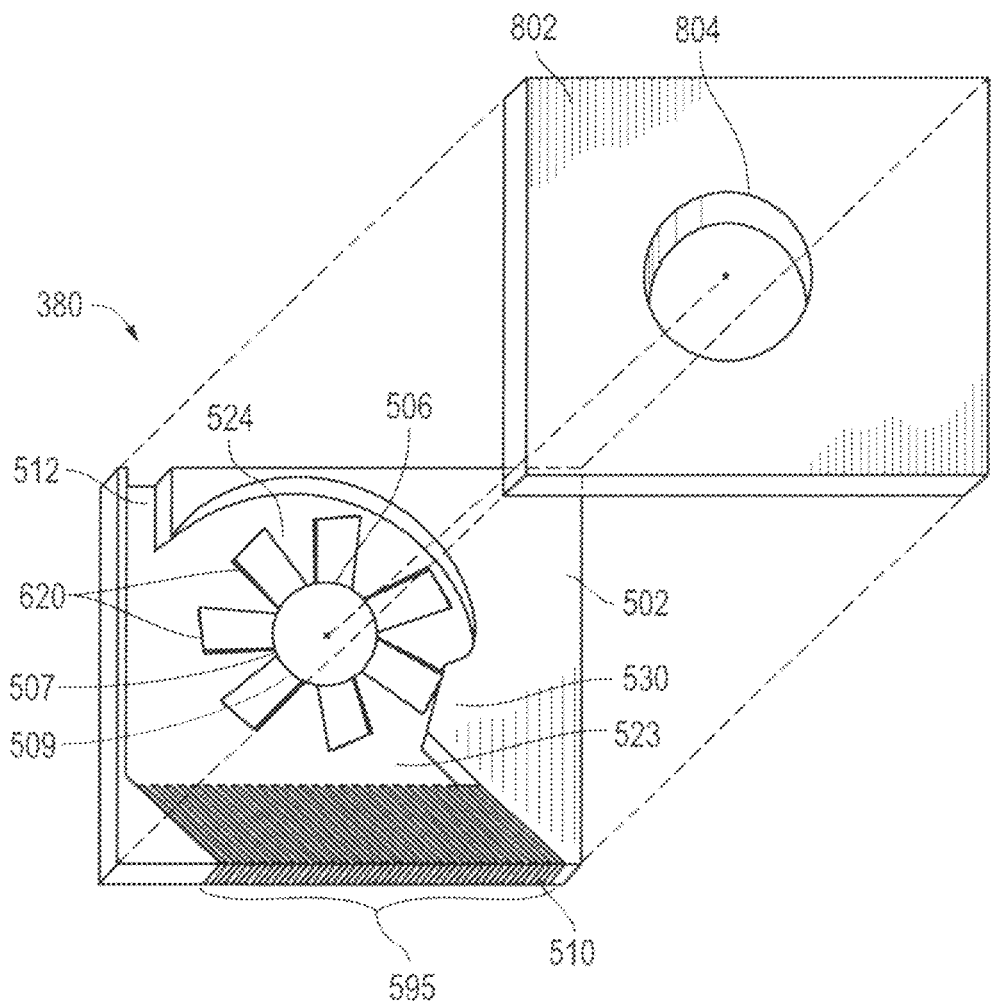
FIG. 13 illustrates a dual operation centrifugal fan apparatus according to one exemplary embodiment of the disclosed apparatus and methods.

FIG. 13 illustrates one possible alternative embodiment in which self-cleaning blower apparatus 380 includes a stator housing component 502 with a vaned rotor component 509 having relatively flat-angled vanes 620 coupled thereto to rotate about its center axis 506 relative to stator component 502. Rotor vanes may be also be configured to be forward-curved, backward-curved or straight relative to the normal first direction of rotation.

Figure 14:
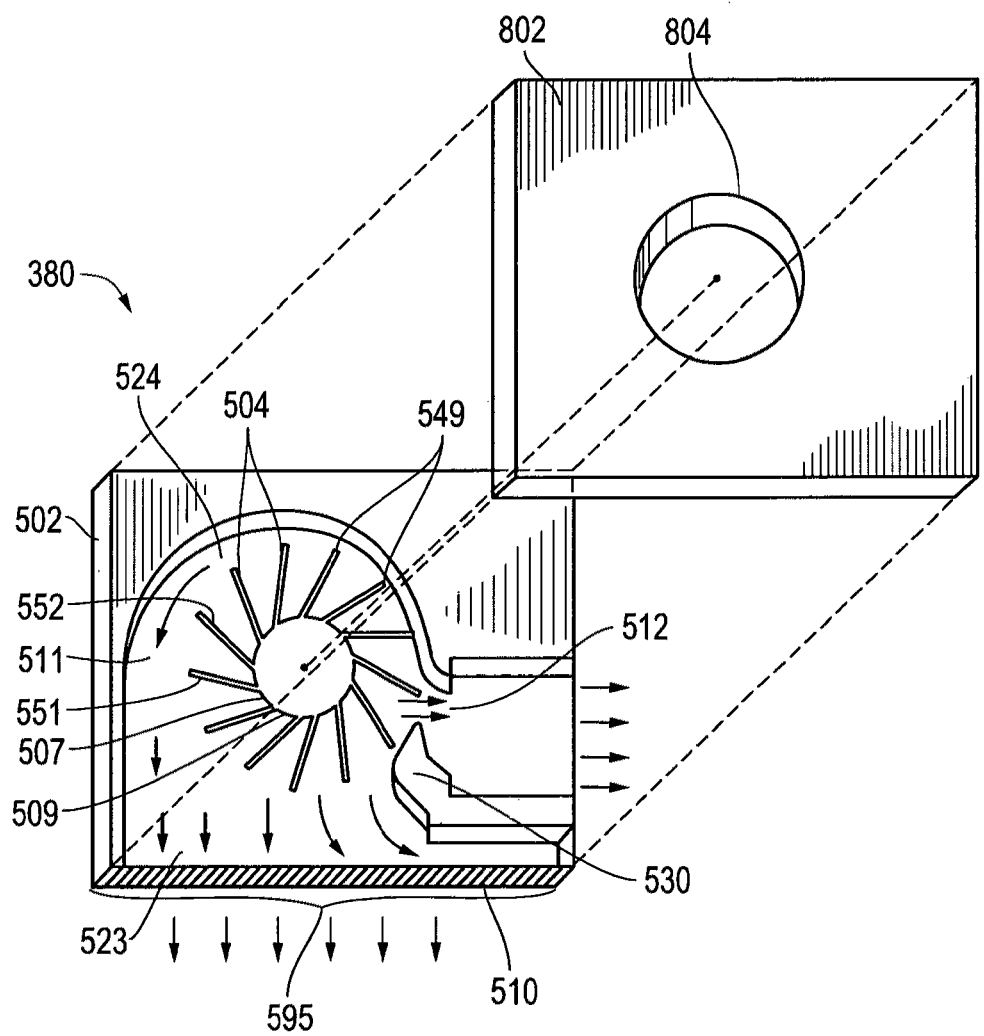
FIG. 14 illustrates a dual operation centrifugal fan apparatus according to one exemplary embodiment of the disclosed apparatus and methods.
Figure 15:
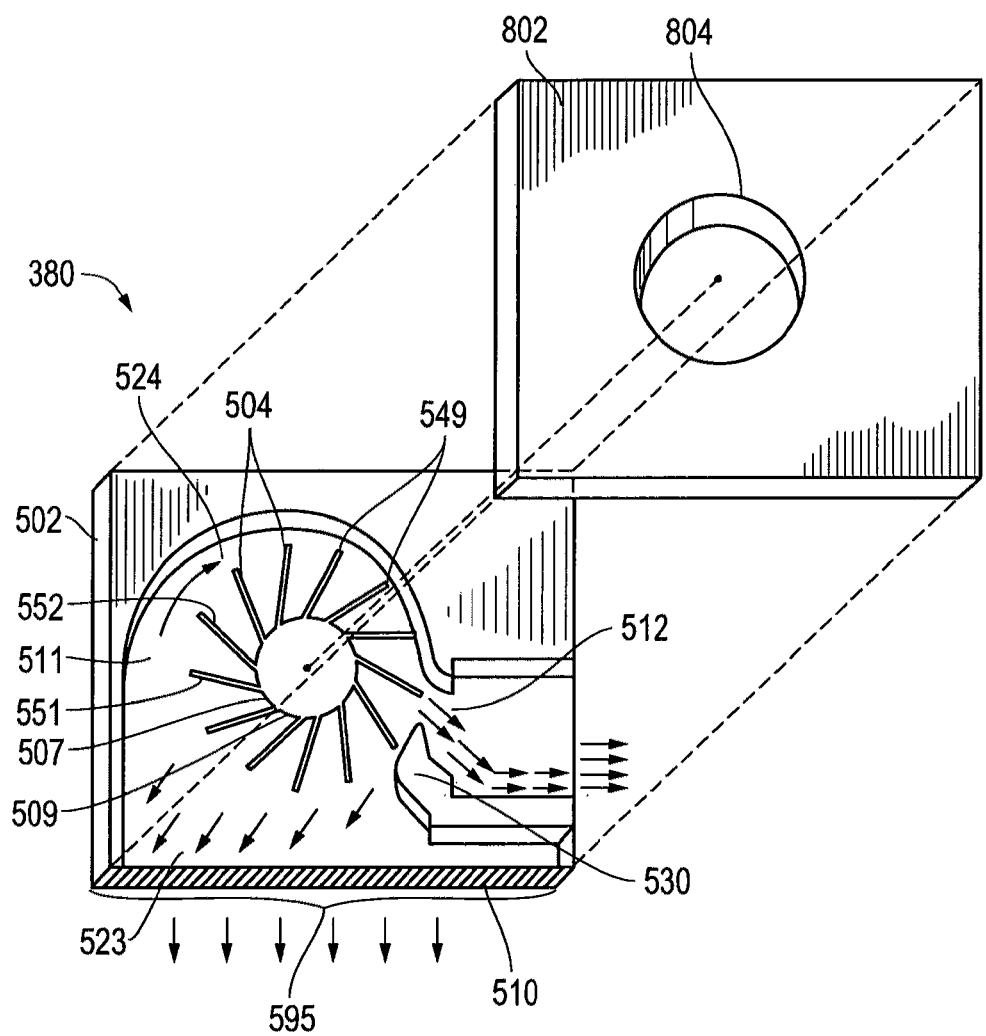
FIG. 15 illustrates a dual operation centrifugal fan apparatus according to one exemplary embodiment of the disclosed apparatus and methods.

FIGS. 14 and 15 illustrate a self-cleaning blower apparatus 380 configured according to another exemplary embodiment that is illustrated in a manner similar to the embodiment of FIGS. 6 and 7. In the alternative embodiment of FIGS. 14 and 15, open side 523 of rotor cavity 511 also does not conform to the outer peripheral shape of vaned rotor 509 and is open to and contiguous with a first circumferential opening 510 defined in the body of the stator housing component 502. However, closed side 524 defined between the body of stator housing component 502 and rotor component 509 terminates at second circumferential opening 512 which is disposed between closed side 524 of rotor cavity 511 and blocking surface 530 of the body of stator housing component 502 which is conformably located adjacent the outer periphery of rotation of vaned rotor component 509 to from a dynamic pneumatic seal that substantially blocks air flow (i.e., prevents bypass airflow) between the outer periphery of vaned rotor 509 and blocking surface 530.

As shown in FIGS. 14 and 15, stator housing cover 802 is configured to cover and at least partially enclose rotor cavity 511, and includes an axial air opening 804 substantially centered over central rotor member 507 that in this embodiment functions as an air inlet for cooling air when rotor component rotates in its first counterclockwise cooling direction and for cleaning air when rotor component rotates in its second clockwise cooling direction.

As further shown in FIGS. 14 and 15, a first circumferential opening 510 is defined in the periphery of stator housing 502 adjacent and continuous with open side 523 of rotor cavity 511. In this exemplary embodiment, first circumferential opening 510 functions as the primary air outlet (i.e., expelling greater than 50% of total expelled air flow from stator housing 502) when rotor component 509 rotates in its first counter clockwise cooling direction, although it is not necessary that it be the primary air outlet in all embodiments. The rotating action of rotor 509 creates centrifugal force that dispels air at first circumferential opening 510 in a direction that is oriented 90 degrees from the direction that the air is taken in through axial air opening 804. First circumferential opening 510 is faced by the oncoming angled front side face 551 of vanes 504 as they move toward open side 523 of rotor cavity 511 against blocking surface 530, which acts to create an area of higher pressure that forces a majority of the intaken air out first circumferential opening 510, although it is not necessary that the majority of the intaken air be forced out first circumferential air opening 510 during cooling rotation for all embodiments. As before, when employed in the exemplary information handling system embodiment of FIG. 5, first circumferential opening 510 may communicate with the interior of base chassis portion 320 to allow blower apparatus 380 to supply cooling air drawn in through air intake opening 350 through first circumferential opening 510 to the interior components of base chassis portion 320 as shown in FIG. 14. It will be understood that dust and other debris may accumulate within rotor cavity 511 during cooling (e.g., counterclockwise) rotation, especially when a grill and/or cooling fins or a heat exchanger are present at first circumferential opening 510, in which case dust and other debris may accumulate on the surfaces of and/or between the individual fins during cooling rotation.

Also illustrated in FIGS. 14 and 15 is a second circumferential opening 512 that is also defined in the periphery of stator housing 502 that in this embodiment is contiguous with closed side 524 of rotor cavity 511 and positioned between blocking surface 530 and closed side 524 of rotor cavity 511. Second circumferential opening 512 functions as the primary air outlet (i.e., expelling greater than 50% of total expelled air flow from stator housing 502) for blower apparatus 380 when rotor component 509 rotates in its second clockwise cleaning direction as shown in FIG. 15, although it is not necessary that second circumferential opening 512 be the primary air outlet during cleaning rotation for all embodiments. The rotating action of rotor 509 creates centrifugal force that dispels air at first circumferential opening 510 in a direction that is oriented 90 degrees from the direction that the air is taken in through axial air opening 804. Second circumferential opening 512 is faced by the oncoming angled back side face 552 of vanes 504 as they move toward blocking surface 530, which acts to create an area of higher pressure that forces a majority of the intaken air out second circumferential opening 512. Since the majority of intaken air is dispelled at second circumferential opening 512 during cleaning (e.g., clockwise) rotation, higher exhaust air pressure and air velocity exists at opening 512 during this time, although it is not always necessary that the majority of intaken air be dispelled at second circumferential opening 512 during cleaning rotation for all embodiments. In any case the change in differential in air pressure between the first and second circumferential air openings 510 and 512 that occurs when switching from cooling rotation to cleaning rotation causes at least a portion of accumulated dust and debris within rotor cavity 511 and/or at associated cooling fins or grill located at first circumferential opening 510 to follow the air pressure gradient and to be exhausted out second circumferential opening 512 during the cleaning (e.g., clockwise) rotation.

Figure 16:
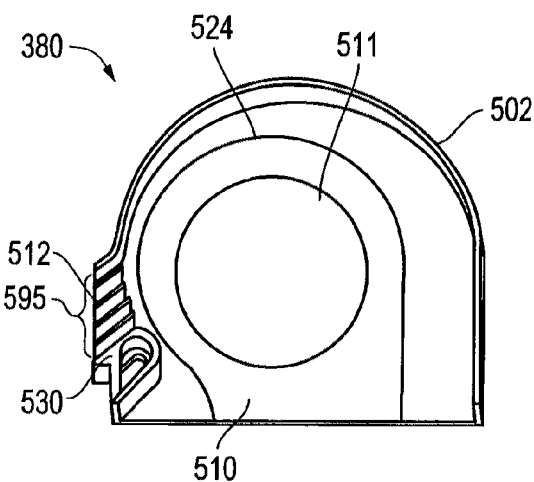
FIG. 16 illustrates a dual operation centrifugal fan apparatus according to one exemplary embodiment of the disclosed apparatus and methods.
Figure 17:
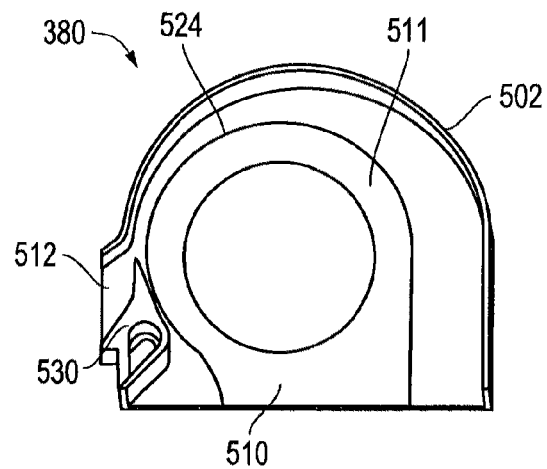
FIG. 17 illustrates a dual operation centrifugal fan apparatus according to one exemplary embodiment of the disclosed apparatus and methods.
Figure 18:
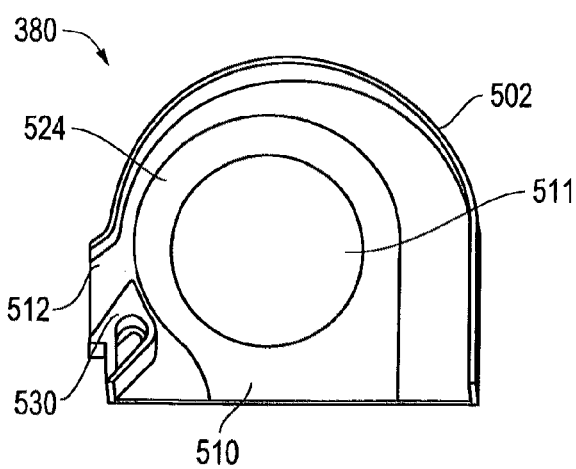
FIG. 18 illustrates a dual operation centrifugal fan apparatus according to one exemplary embodiment of the disclosed apparatus and methods.

FIGS. 16-18 illustrate just a few possible alternative embodiments of stator component 502 of self-cleaning blower apparatus 380 having varying configurations of second circumferential opening 512 defined in the periphery of stator housing 502 between closed side 524 and blocking surface 530 of rotor cavity 511. In FIGS. 16-18, rotor component 509 has been omitted from view, and the orientation of blower apparatus 380 reversed such that cooling operation is achieved by clockwise rotation of rotor component 509 and dust cleaning operation is achieved by counterclockwise rotation of rotor component 509. Additionally, FIG. 16 illustrates the presence of grill fins 595 at second circumferential opening 512. FIG. 18 substantially corresponds to the embodiment of FIGS. 14-15, but with the orientation of blower apparatus 380 reversed such that cooling operation is achieved by clockwise rotation of rotor component 509 and dust cleaning operation is achieved by counterclockwise rotation of rotor component 509.

Table 1 below illustrates air flow volume comparison for the embodiments of FIGS. 16-18. As may be seen, the embodiment of FIG. 18 achieves preferential (i.e., majority or greater than 50%) of total air flow out second circumferential opening 512 during cleaning direction rotation of rotor component 509, in this case 2.75 cubic foot per minute (CFM) cleaning direction air out second circumferential opening 512 as compared to 2.22 CFM cleaning direction air out first circumferential opening 510. This makes second circumferential opening 512 of FIG. 18 the primary air outlet during cleaning direction rotation of rotor component 509. The embodiment of FIG. 18 also achieves a high ratio of preferential (i.e., majority or greater than 50%) of total cooling air flow out of first circumferential opening 510 during cleaning direction rotation of rotor component 509, in this case 8.48 CFM cooling air out first circumferential opening 510 and 0.62 CFM cooling air out second circumferential opening 512 during cooling rotation. This makes first circumferential opening 510 of FIG. 18 the primary air outlet during cooling direction rotation of rotor component 509.

The embodiments of FIGS. 16 and 17 do not achieve preferential (i.e., majority or greater than 50%) cleaning air flow out second circumferential opening 512 during cleaning rotation, but do achieve the exhaust of some cleaning air out second circumferential air opening 512 during cleaning rotation, while achieving preferential (i.e., majority or greater than 50%) cooling air flow out first circumferential opening 510 during cooling rotation.

TABLE 1

|  | FIG. 16 | | FIG. 17 | | FIG. 18 | |
| --- | --- | --- | --- | --- | --- | --- |
|  | Rotation Direction | | | | | |
|  | Cooling Direction | Cleaning Direction | Cooling Direction | Cleaning Direction | Cooling Direction | Cleaning Direction |
| First Outlet 510 | 8.29 CFM | 2.68 CFM | 8.34 CFM | 2.99 CFM | 8.48 CFM | 2.22 CFM |
| Second Outlet 512 | 0.69 CFM | 1.89 CFM | 0.48 CFM | 1.89 CFM | 0.62 CFM | 2.75 CFM |

It will be understood that one or more of the tasks, functions, or methodologies described herein may be implemented, for example, as firmware or other computer program of instructions embodied in a non-transitory tangible computer readable medium that is executed by a CPU, controller, microcontroller, processor, microprocessor, FPGA, ASIC, or other suitable processing device.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed apparatus and methods may be utilized in various combinations and/or independently. Thus the invention is not limited to only those combinations shown herein, but rather may include other combinations.

What is claimed is:

1. An information handling system, comprising:
   a chassis enclosing one or more information handling system components, the chassis having at least one gas intake opening defined in an outer surface of the chassis, and at least one cleaning gas exhaust opening defined in an outer surface of the chassis;
   at least one individual centrifugal fan apparatus coupled to the chassis, the individual centrifugal fan apparatus comprising:
      a stator housing component, and a vaned rotor component rotatably received within a rotor cavity defined in the stator housing component, the vaned rotor component comprising multiple rotor vanes radiating outward from a central rotor member coupled to rotate about an axis of rotation within the rotor cavity relative to the stator housing component,
      three separate openings defined in the stator housing component of the individual centrifugal fan apparatus, the three separate openings comprising a first circumferential opening, a second circumferential opening separate from the first circumferential opening, and an axial gas opening, the second circumferential opening and first circumferential opening being defined on opposite circumferential sides of the stator housing component and rotor cavity from each other, a rotor driver mechanically coupled to drive the vaned rotor component in a first cooling direction and a second cleaning direction that is opposite in rotation from the first cooling direction, wherein the rotor cavity has an open circumferential side and a closed circumferential side, the closed circumferential side of the rotor cavity being defined between a body of the stator housing component and the vaned rotor component to conform to the outer peripheral shape of the vaned rotor component, each of the open circumferential side and the closed circumferential side of the vaned rotor component being oriented parallel to the axis of rotation of the vaned rotor component and disposed at an outer periphery of the rotor vanes of the vaned rotor component, the first circumferential opening being defined in a periphery of the stator housing component adjacent and continuous with the open circumferential side of the rotor cavity, and the second circumferential opening being defined in the closed side of the rotor cavity, where the closed circumferential side of the rotor cavity extends between the second circumferential opening and terminates at a circumferential blocking surface of the stator component that is disposed between the closed circumferential side of the rotor cavity and the first circumferential opening, the circumferential blocking surface being conformably located closer to the outer periphery of rotation of the vaned rotor component than is the closed circumferential side of the rotor cavity, where the circumferential blocking surface and outer periphery of the closed circumferential side of the rotor cavity join to form a continuous peripheral wall around a portion of the vaned rotor component, the continuous peripheral wall extending from the second circumferential opening to the first circumferential opening, where the first circumferential opening defined in the stator housing component is configured to act as a gas outlet for expelling gas in a first gas flow from the first circumferential opening and into an interior space of the chassis for cooling the information handling system components when the vaned rotor component rotates in the first cooling direction, where the second circumferential opening defined in the stator housing component is coupled to the at least one cleaning gas exhaust opening defined in the outer surface of the chassis and is configured to act as a gas outlet for expelling gas outside of the chassis when the vaned rotor component rotates in the second cleaning direction that is opposite in rotation from the first cooling direction, and where the axial gas opening is defined in the stator housing component over the vaned rotor component, the axial gas opening coupled to the at least one gas intake opening defined in the outer surface of the chassis, and the axial gas opening configured to act as a gas inlet for drawing in gas in a second gas flow from outside the chassis when the vaned rotor component rotates in the first cooling direction, the direction of the second gas flow drawn in by the axial gas opening being oriented at a right angle to the direction of the first gas flow expelled from the first circumferential opening such that gas flows from the direction of the second gas flow toward the direction of the first gas flow when the vaned rotor component rotates in the first cooling direction.

2. The information handling system of claim 1, wherein the first circumferential opening is configured to act as a gas inlet for drawing in gas and accumulated debris in a third gas flow that is reverse in flow direction to the first gas flow and that is into the first circumferential opening and from the interior space of the chassis when the vaned rotor component rotates about its axis of rotation in the second cleaning direction of rotation that is opposite in rotation from the first cooling direction of rotation, and where the second circumferential opening is configured to act as a gas outlet for expelling gas in a fourth gas flow from the second circumferential opening when the vaned rotor component rotates in the second cleaning direction, the direction of the third gas flow and the direction of the fourth gas flow being each oriented at a right angle to the second direction.

3. The information handling system of claim 2, wherein the first circumferential opening is defined in the periphery of the stator housing component, the first circumferential opening configured to act as a gas outlet when the vaned rotor component rotates about its axis of rotation within the rotor cavity in the first direction of rotation and to act as a gas inlet when the vaned rotor component rotates about its axis of rotation within the rotor cavity in the second direction of rotation that is opposite in rotation from the first direction of rotation; wherein the second circumferential opening is defined in the periphery of the stator housing component, the second circumferential opening extending through the outer surface of the chassis to define the at least one cleaning gas exhaust opening in the outer surface of the chassis and being configured to act as a gas and debris outlet to expel the gas and accumulated debris from the interior space through the cleaning gas exhaust opening to outside of the chassis when the vaned rotor component rotates about its axis of rotation within the rotor cavity in a second direction of rotation that is opposite in rotation from the first direction of rotation; and wherein the axial gas opening is configured such that substantially no gas is drawn in through the axial gas opening and substantially no gas is exhausted through the axial gas opening when the vaned rotor component rotates about its axis of rotation within the rotor cavity in the second direction of rotation; wherein the vaned rotor has multiple angled rotor vanes radiating outward from the central rotor member; and wherein the axial gas opening is substantially centered over the central rotor member.

4. The information handling system of claim 1, where the axial gas opening over the vaned rotor component is disposed between the gas intake opening defined in the outer surface of the chassis and the interior space of the chassis to form a closed conduit that extends from the chassis gas intake opening through the axial gas opening and through the rotor cavity to the chassis interior; wherein the axial gas opening is further configured to act as a gas inlet when the vaned rotor component rotates about its axis of rotation in the second direction of rotation that is opposite in rotation from the first direction of rotation to draw in gas in the second gas flow from outside the chassis through the chassis gas intake opening and through the axial gas opening into the rotor cavity before the gas enters the chassis interior; and wherein the first and second circumferential openings defined in the stator housing component are each configured to act as gas outlets when the vaned rotor component rotates about its axis of rotation in the second direction of rotation that is opposite in rotation from the first direction to cause at least a portion of any accumulated dust and debris within the rotor cavity or that is present at any cooling fins or grill located at the first circumferential opening to be expelled out the second circumferential opening when the vaned rotor component rotates about its axis of rotation in the second direction of rotation.

5. The information handling system of claim 1, wherein the chassis comprises a notebook computer base chassis portion.

6. The information handling system of claim 1, further comprising at least one processing device coupled to selectably control the direction of rotation of the vaned rotor component about its axis of rotation by maintaining the direction of rotation of the vaned rotor component about its axis of rotation in the first cooling direction of rotation, and temporarily switching rotation of the vaned rotor component about its axis of rotation to the second cleaning direction of rotation in response to input from a user of the information handling system entered via an input/output device of the information handling system.

7. The information handling system of claim 6, further comprising at least one processing device coupled to selectably control the direction of rotation of the vaned rotor component about its axis of rotation by maintaining the direction of rotation of the vaned rotor component in the first cooling direction of rotation, and temporarily switching rotation of the vaned rotor component about its axis of rotation to the second cleaning direction of rotation upon occurrence of at least one of a boot up or power up event of the information handling system, a power down event of the information handling system, or both.

8. The information handling system of claim 6, further comprising at least one processing device coupled to selectably control the direction of rotation of the vaned rotor component about its axis of rotation by maintaining the direction of rotation of the vaned rotor component in the first cooling direction, and temporarily switching rotation of the vaned rotor component about its axis of rotation to the second cleaning direction after a given amount of cumulative elapsed operating time of the information handling system.

9. The information handling system of claim 6, further comprising a temperature sensor configured to sense an operating temperature inside the chassis and coupled to communicate a signal representative thereof to the processing device; and further comprising at least one processing device coupled to selectably control the direction of rotation of the vaned rotor component about its axis of rotation by maintaining the direction of rotation of the vaned rotor component in the first cooling direction, and temporarily switching rotation of the vaned rotor component about its axis of rotation to the second cleaning direction upon detection by the temperature sensor of an operating temperature inside the chassis that exceeds a predetermined high temperature threshold.

10. The information handling system of claim 1, where both the first and second circumferential openings are configured to act as gas outlets for expelling gas when the vaned rotor component rotates about its axis of rotation in either the first cooling direction of rotation or second cleaning direction of rotation.

11. The information handling system of claim 10, where the first circumferential opening is configured to dispel a relatively greater amount of air during the first cooling direction of rotation than during the second cleaning direction of rotation; where the second circumferential opening is configured to dispel a relatively greater amount of air during the second cleaning direction of rotation than during the first cooling direction of rotation; and where the change in differential in air pressure between the first and second circumferential openings that occurs when switching from the first cooling direction of rotation to the second cleaning direction of rotation causes at least a portion of any accumulated dust and debris within the rotor cavity or that is present at any cooling fins or grill located at the first circumferential opening to be expelled out the second circumferential opening when the vaned rotor component rotates about its axis of rotation in the second direction of rotation.

12. The information handling system of claim 1, where the vaned rotor component has an axis of rotation and is coupled to rotate about the axis of rotation relative to the stator housing component to define an outer periphery of rotation; where the rotor driver is mechanically coupled to rotate the vaned rotor component about the axis of rotation in each of a first cooling direction of rotation and a second cleaning direction of rotation that is opposite in rotation of rotation from the first cooling direction of rotation; where the first circumferential opening is defined in the stator housing in a position peripheral to the vaned rotor component and beyond the outer periphery of rotation of the vaned rotor component, the first circumferential opening configured to act as a gas outlet for expelling gas into an interior space of the chassis for cooling the information handling system components when the vaned rotor component rotates about its axis of rotation in a first cooling direction of rotation; where the second circumferential opening is coupled to the at least one cleaning gas exhaust opening defined in the outer surface of the chassis and is configured to act as a gas outlet for expelling gas outside of the chassis when the vaned rotor component rotates about its axis of rotation in a second cleaning direction of rotation that is opposite in direction of rotation from the first cooling direction of rotation; and where the axial gas opening is configured to act as a gas inlet for drawing in gas from outside the chassis when the vaned rotor component rotates about its axis of rotation in the first cooling direction of rotation.

13. The information handling system of claim 1, where the first cooling direction of rotation of the vaned rotor component is a clockwise direction of rotation, and where the second cleaning direction of rotation of the vaned rotor component is a counter-clockwise direction of rotation; or where the first cooling direction of rotation of the vaned rotor component is a counter-clockwise direction of rotation, and where the second cleaning direction of rotation of the vaned rotor component is a clockwise direction of rotation.

14. The information handling system of claim 1, where the stator housing component is separate from the chassis enclosure and disposed within the chassis enclosure, where the vaned rotor component is rotatably received within a rotor cavity defined in the stator housing component to form the fan apparatus inside of and separate from the chassis enclosure.

15. The information handling system of claim 1, where the rotating action of the vaned rotor component is configured to create a centrifugal force that dispels gas out the first circumferential opening in a direction that is oriented about 90 degrees from the direction that gas is drawn in through the axial opening; and where the rotating action of the vaned rotor component is configured to create a centrifugal force that dispels gas out the second circumferential opening in a direction that is oriented about 90 degrees from the direction that gas is drawn in through the axial opening.

16. The information handling system of claim 1, where the centrifugal fan apparatus further comprises a sealing component configured to prevent gas from being drawn in through the second circumferential opening when the vaned rotor component is rotating in the first direction and to allow gas to be expelled out the second circumferential opening when the vaned rotor component is rotating in the second direction.

17. The information handling system of claim 16, where the sealing component comprises a self-closing hinged flapper door that is configured to close due to inward gas pressure differential.

18. The information handling system of claim 1, where the vaned rotor component has a central rotor member coupled to rotate relative to the stator housing component and has multiple angled rotor vanes radiating outward from the central rotor member; wherein the rotor cavity has an open circumferential side and a closed circumferential side, the first circumferential opening being defined in the circumferential periphery of the stator housing component adjacent and continuous with the open circumferential side of the rotor cavity; wherein the axial gas opening is substantially centered over the central rotor member; and wherein the closed circumferential side of the rotor cavity terminates at the second circumferential opening with the closed circumferential side of the rotor cavity being disposed between the second circumferential opening and the circumferential blocking surface of the stator housing component which forms a pneumatic seal with the peripheral ends of the vanes of the vaned rotor component to substantially block air flow between an outer periphery of the vanes of the vaned rotor component and the circumferential blocking surface between the closed circumferential side of the rotor cavity and the first circumferential opening.

19. The information handling system of claim 1, where the circumferential blocking surface is disposed at the periphery of the vaned rotor component between the first circumferential opening and the closed circumferential side of the rotor cavity; and where the closed circumferential side of the rotor cavity is disposed between the circumferential blocking surface and the second circumferential opening.

20. The information handling system of claim 1, where the axial gas opening is the gas intake opening defined in the outer surface of the chassis; and where the second circumferential opening extends through the outer surface of the chassis to define the at least one cleaning gas exhaust opening in the outer surface of the chassis.

21. A method of operating an information handling system, comprising:
providing a chassis enclosing one or more information handling system components, the chassis having at least one gas intake opening defined in an outer surface of the chassis, and at least one cleaning gas exhaust opening defined in an outer surface of the chassis;
providing at least one individual centrifugal fan apparatus coupled to the chassis, the individual centrifugal fan apparatus comprising:
a stator housing component and a vaned rotor component rotatably received within a rotor cavity defined in the stator housing component, the vaned rotor component comprising multiple rotor vanes radiating outward from a central rotor member coupled to rotate about an axis of rotation within the rotor cavity relative to the stator housing component,
three separate openings defined in the stator housing component of the individual centrifugal fan apparatus, the three separate openings comprising a first circumferential opening, a second circumferential opening separate from the first circumferential opening, and an axial gas opening, the second circumferential opening and first circumferential opening being defined on opposite circumferential sides of the stator housing component and rotor cavity from each other,
wherein the rotor cavity has an open circumferential side and a closed circumferential side, the closed circumferential side of the rotor cavity being defined between a body of the stator housing component and the vaned rotor component to conform to the outer peripheral shape of the vaned rotor component, each of the open circumferential side and the closed circumferential side of the vaned rotor component being oriented parallel to the axis of rotation of the vaned rotor component and disposed at the outer periphery of the rotor vanes of the vaned rotor component, the first circumferential opening being defined in a periphery of the stator housing component adjacent and continuous with the open circumferential side of the rotor cavity, and the second circumferential opening being defined in the closed side of the rotor cavity,
where the closed circumferential side of the rotor cavity extends between the second circumferential opening and terminates at a circumferential blocking surface of the stator housing component that is disposed between the closed circumferential side of the rotor cavity and the first circumferential opening, the circumferential blocking surface being conformably located closer to the outer periphery of rotation of the vaned rotor component than is the closed circumferential side of the rotor cavity,
where the circumferential blocking surface and outer periphery of the closed circumferential side of the rotor cavity join to form a continuous peripheral wall around a portion of the vaned rotor component, the continuous peripheral wall extending from the second circumferential opening to the first circumferential opening,
where the first circumferential opening defined in the stator housing component is configured to act as a gas outlet for expelling gas in a first gas flow into an interior space of the chassis,
where the second circumferential opening defined in the stator housing component is coupled to the at least one cleaning gas exhaust opening defined in the outer surface of the chassis, and
where the axial gas opening is defined in the stator housing component over the vaned rotor component, the axial gas opening coupled to the at least one gas intake opening defined in the outer surface of the chassis; and
rotating the vaned rotor component in a first cooling direction to draw in gas in a second gas flow from the at least one gas intake opening defined in the outer surface of the chassis through the axial gas opening defined in the stator housing component, and to expel the drawn in gas into the interior space of the chassis in the first gas flow through the first circumferential opening defined in the stator housing component for cooling the information handling system components, the direction of the second gas flow drawn in by the axial gas opening being oriented at a right angle to the direction of the first gas flow expelled from the first circumferential opening such that gas flows from the direction of the second gas flow toward the direction of the first gas flow; and rotating the vaned rotor component in a second cleaning direction to expel drawn in gas from the second circumferential opening defined in the stator housing component out through the cleaning gas exhaust opening to expel gas outside of the chassis.

22. The method of claim 21, further comprising rotating the vaned rotor component in the second cleaning direction to draw in gas and any accumulated debris from the interior space of the chassis through the first circumferential opening defined in the stator housing component, and to expel the drawn in gas and any accumulated debris from the second circumferential opening defined in the stator housing component out through the cleaning gas exhaust opening; where substantially no gas is drawn in through the second circumferential gas opening when the vaned rotor component is rotated in the first cooling direction, and where substantially no gas is expelled from the axial gas opening when the vaned rotor component is rotated in the second cleaning direction.

23. The method of claim 21, wherein the method further comprises rotating the vaned rotor component in the second cleaning direction to draw in gas from the axial gas opening and to expel the drawn in gas through the first and second circumferential openings to cause at least a portion of any accumulated dust and debris within the rotor cavity or that is present at any cooling fins or grill located at the first circumferential opening to be expelled out the second circumferential opening.

24. The method of claim 21, wherein the chassis comprises a notebook computer base chassis portion.

25. The method of claim 21, further comprising maintaining the direction of rotation of the vaned rotor component in the first cooling direction, and temporarily reversing rotation of the vaned rotor component to the second cleaning direction in response to input from a user of the information handling system entered via an input/output device of the information handling system.

26. The method of claim 21, further comprising maintaining the direction of rotation of the vaned rotor component in the first cooling direction, and temporarily reversing rotation of the vaned rotor component to the second cleaning direction upon occurrence of at least one of a boot up or power up event of the information handling system, a power down event of the information handling system, or both.

27. The method of claim 21, further comprising maintaining the direction of rotation of the vaned rotor component in the first cooling direction, and temporarily reversing rotation of the vaned rotor component to the second cleaning direction after a given amount of cumulative elapsed operating time of the information handling system.

28. The method of claim 21, further comprising maintaining the direction of rotation of the vaned rotor component in the first cooling direction, and temporarily reversing rotation of the vaned rotor component to the second cleaning direction upon detection by the temperature sensor of an operating temperature inside the chassis that exceeds a predetermined high temperature threshold.

* * * * *